(12) United States Patent
Shen et al.

(10) Patent No.: US 12,372,674 B2
(45) Date of Patent: Jul. 29, 2025

(54) X-RAY DETECTORS WITH PLASTIC HOUSINGS

(71) Applicant: Varex Imaging Corporation, Salt Lake City, UT (US)

(72) Inventors: Xiaoyang Shen, Salt Lake City, UT (US); Marcelo C. Costa, Draper, UT (US); Matt McCabe, Kearns, UT (US)

(73) Assignee: Varex Imaging Corporation, Salt Lake City, UT (US)

( * ) Notice: Subject to any disclaimer, the term of this patent is extended or adjusted under 35 U.S.C. 154(b) by 0 days.

(21) Appl. No.: 18/261,106

(22) PCT Filed: Apr. 1, 2022

(86) PCT No.: PCT/US2022/023156
§ 371 (c)(1),
(2) Date: Jul. 11, 2023

(87) PCT Pub. No.: WO2022/212909
PCT Pub. Date: Oct. 6, 2022

(65) Prior Publication Data
US 2024/0085578 A1    Mar. 14, 2024

Related U.S. Application Data

(63) Continuation-in-part of application No. 17/234,645, filed on Apr. 19, 2021, now Pat. No. 12,032,106.
(Continued)

(51) Int. Cl.
*G01T 1/24*    (2006.01)
*G01T 1/20*    (2006.01)

(52) U.S. Cl.
CPC ............ *G01T 1/244* (2013.01); *G01T 1/2019* (2020.05); *G01T 1/243* (2013.01)

(58) Field of Classification Search
CPC ...................................... G01T 1/244
See application file for complete search history.

(56) References Cited

U.S. PATENT DOCUMENTS

| 4,338,521 A |   | 7/1982 | Shaw et al. |
| 8,680,475 B2 | * | 3/2014 | Konkle ................ G01T 1/2018 |
|  |  |  | 250/370.09 |

(Continued)

FOREIGN PATENT DOCUMENTS

| EP | 3627192 | 3/2020 |
| JP | 2004-141473 | 5/2004 |

(Continued)

OTHER PUBLICATIONS

PCT/US2022/023156, International Search Report dated Jul. 25, 2022.

(Continued)

*Primary Examiner* — Carolyn Fin
(74) *Attorney, Agent, or Firm* — Laurence & Phillips IP Law

(57) ABSTRACT

Some embodiments include an x-ray detector, comprising: a plastic housing; a two-dimensional sensor array disposed in a within the plastic housing and configured to generate image data in response to incident x-rays; a front plate connected to the plastic housing, the front plate and the plastic housing forming an enclosure surrounding the two-dimensional sensor array; and a printed circuit board mounted to the plastic housing at a plurality of mount points, wherein a centroid of the printed circuit board is closer to a center of the plastic housing than a centroid of the mount points.

21 Claims, 19 Drawing Sheets

Related U.S. Application Data

(60) Provisional application No. 63/169,805, filed on Apr. 1, 2021.

(56) References Cited

U.S. PATENT DOCUMENTS

| | | | |
|---|---|---|---|
| 9,104,097 B2 | 8/2015 | Suwa | |
| 2007/0096030 A1 | 5/2007 | Li et al. | |
| 2010/0246771 A1* | 9/2010 | Hawver | G03B 42/02 |
| | | | 378/98.2 |
| 2011/0133096 A1 | 6/2011 | Konkle et al. | |
| 2014/0084161 A1* | 3/2014 | Takatori | G03B 42/04 |
| | | | 250/336.1 |
| 2014/0197319 A1 | 7/2014 | Bavendiek | |
| 2015/0342553 A1* | 12/2015 | Sato | A61B 6/4291 |
| | | | 250/336.1 |
| 2019/0353810 A1 | 11/2019 | Bogumil et al. | |

FOREIGN PATENT DOCUMENTS

| | | |
|---|---|---|
| JP | 2013-007712 | 1/2013 |
| WO | 2018221976 | 12/2018 |

OTHER PUBLICATIONS

PCT/US2022/023156, Written Opinion dated Jul. 25, 2022.
PPG Industrial Coatings, Electronic Materials Group, Series 599-B3755, Silver-Coated Copper Conductive Coating (2014).
U.S. Appl. No. 17/234,645, Office Action dated Jun. 22, 2023.
U.S. Appl. No. 17/234,645, Response to Office Action dated Dec. 18, 2023.
U.S. Appl. No. 17/234,645, Examiner-Initiated Interview Summary dated Jan. 30, 2024.
U.S. Appl. No. 17/234,645, Notice of Allowance dated Jan. 30, 2024.
U.S. Appl. No. 17/234,645, Office Action dated Apr. 10, 2024.
No. 22782335.8, European Search Report dated Jan. 20, 2025 (9 pages).

* cited by examiner

X-RAY DETECTORS WITH PLASTIC HOUSINGS

TECHNICAL FIELD

The field of this disclosure relates generally to x-ray detectors with plastic housings.

BACKGROUND

X-ray detectors are conventionally formed from metal housings. The metal housings provide rigidity to the detector to resist loads experienced during use, such as the weight of a patient on the x-ray detector during an imaging operation. Access panels or doors may be formed over an antenna within the metal housing as the antenna cannot communicate through the walls of the metal housing.

BRIEF SUMMARY OF THE INVENTION

Embodiments include an x-ray detector, comprising: a plastic housing; a two-dimensional sensor array disposed in a within the plastic housing and configured to generate image data in response to incident x-rays; a front plate connected to the plastic housing, the front plate and the plastic housing forming an enclosure surrounding the two-dimensional sensor array; and a printed circuit board mounted to the plastic housing at a plurality of mount points; wherein a centroid of the printed circuit board is closer to a center of the plastic housing than a centroid of the mount points.

In some embodiments, the two-dimensional sensor array includes a flexible substrate.

In some embodiments, a first number of the mount points are disposed along an edge of the printed circuit board furthest from the center of the plastic housing; a second number of mount points are disposed along an edge of the printed circuit board closest to the center of the plastic housing; and the first number is greater than the second number.

In some embodiments, the printed circuit board is disposed along an edge of the plastic housing where the centroid of the printed circuit board is closer to the edge than the center of the plastic housing.

In some embodiments, a first dimension of the printed circuit board along an axis including the center of the plastic housing is less than a second dimension of the printed circuit board along a major axis of the printed circuit board.

In some embodiments, the x-ray detector further comprises a modular adapter having a first mechanical interface and a second mechanical interface; wherein the plastic housing includes a receptacle configured to receive the modular adapter and the receptacle includes a third mechanical interface configured to mate with the first mechanical interface.

In some embodiments, the x-ray detector further comprises a user interface disposed within the plastic housing; wherein: the plastic housing and the front plate form at least a part of an ingress protection boundary; and the user interface is accessible through the plastic housing without penetrating the ingress protection boundary.

In some embodiments, the x-ray detector further comprises a user interface disposed outside of the plastic housing; and an electrical interface electrically connecting the user interface to a circuit within the plastic housing; wherein: the plastic housing, the electrical interface, and the front plate form at least a part of an ingress protection boundary.

In some embodiments, the front plate includes an outer surface facing an exterior of the x-ray detector; and the plastic housing includes a wall extending further from the x-ray detector than the outer surface of the front plate along an axis perpendicular to the outer surface of the front plate.

In some embodiments, the x-ray detector further comprises a conductive sheet; and an insulating sheet disposed between the conductive sheet and the front plate such that the front plate is insulated from the conductive sheet; wherein: the plastic housing includes a conductive coating electrically connected to the conductive sheet.

In some embodiments, the x-ray detector further comprises a conductive support configured to support the front plate; a conductive sheet electrically coupled to the conductive support; and an electromagnetic interference shield around the two-dimensional sensor array; wherein: the conductive support, and the conductive sheet are at least part of the electromagnetic interference shield.

In some embodiments, the x-ray detector further comprises a conductive gasket disposed between the conductive sheet and the conductive support, electrically connected to the conductive sheet and the conductive support, and configured to seal an interface between the conductive sheet and the conductive support.

In some embodiments, the x-ray detector further comprises a plurality of metal fasteners configured to attach together the plastic housing to at least one of the two-dimensional sensor array, the front plate, and the printed circuit board; wherein each of the metal fasteners is disposed such that the metal fastener mates with a non-metal component.

In some embodiments, the x-ray detector further comprises at least one rigid component attached to the plastic housing; wherein the at least one rigid component includes a plate.

In some embodiments, the x-ray detector further comprises an electromagnetic interference shield around the two-dimensional sensor array; wherein the front plate includes an insulating material outside of the electromagnetic interference shield.

Some embodiments include a method of forming an x-ray detector, comprising: providing a plastic housing; attaching a two-dimensional sensor array configured to generate image data in response to incident x-rays to the plastic housing; attaching a printed circuit board to the plastic housing at a plurality of mount points where a centroid of the printed circuit board is closer to a center of the plastic housing than a centroid of the mount points; and forming an enclosure surrounding the two-dimensional sensor array using the plastic housing and a front plate.

In some embodiments, the method further comprises attaching at least one modular adapter to a corresponding receptacle in the plastic housing.

In some embodiments, the method further comprises electrically insulating the front plate of the x-ray detector from an electromagnetic interference shield around the two-dimensional sensor array.

In some embodiments, at least one of attaching the printed circuit board to the plastic housing and forming the enclosure surrounding the two-dimensional sensor array using the plastic housing and the front plate comprises attaching a metal fastener to a non-metal component.

The method of claim 16, further comprising: mounting a user interface to the plastic housing such that the user interface is accessible through the plastic housing.

Some embodiments include an x-ray detector, comprising: a plastic housing including a conductive coating; a flexible two-dimensional sensor array disposed in a within the plastic housing and configured to generate image data in response to incident x-rays; a front plate connected to the plastic housing, the front plate and the plastic housing forming an enclosure surrounding the two-dimensional sensor array; and an electromagnetic interference shield around the two-dimensional sensor array; wherein the conductive coating and the front plate are at least part of the electromagnetic interference shield.

DETAILED DESCRIPTION

Some embodiments relate to x-ray detectors with plastic housings. A plastic housing may reduce a weight and/or cost of an x-ray detector. Various modifications to the x-ray detector with the plastic housing may improve electromagnetic interference performance, intrusion performance, physical load specifications, or the like.

Figure 1:
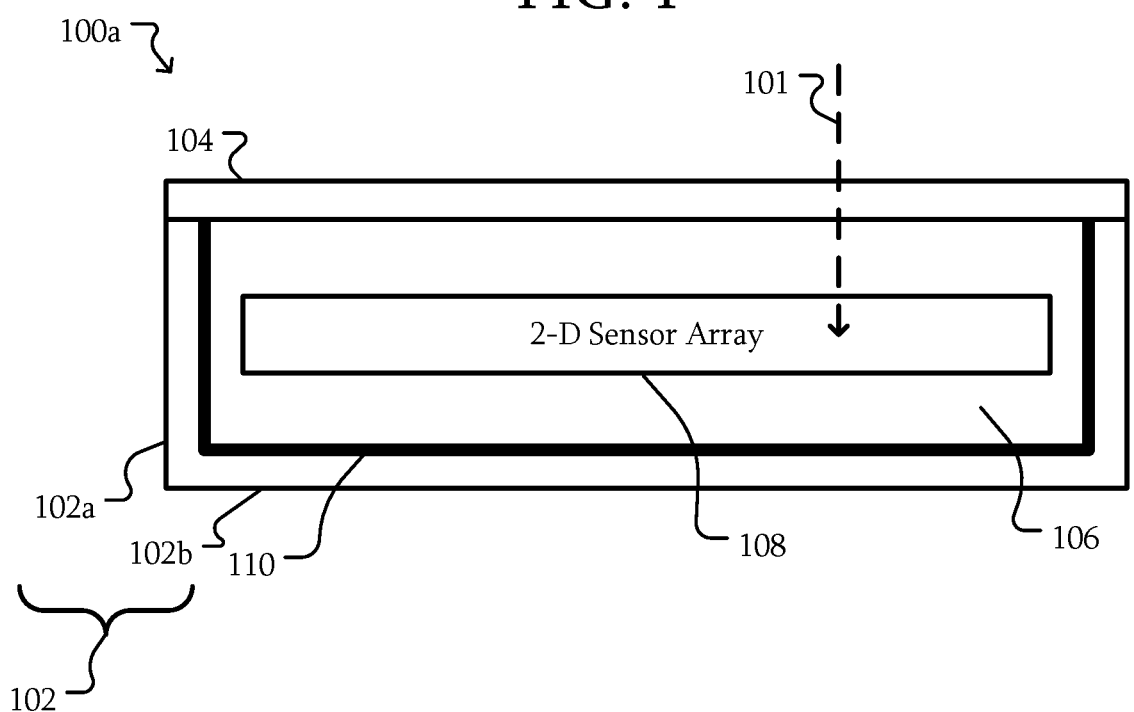
FIG. 1 is a block diagram of an x-ray detector with a plastic housing according to some embodiments.

FIG. 1 is a block diagram of an x-ray detector with a plastic housing according to some embodiments. In some embodiments, the x-ray detector 100a includes a plastic housing 102, a front plate 104, a two-dimensional sensor array 108, and a conductive coating 110.

The two-dimensional sensor array 108 is disposed in a within the plastic housing 102. The two-dimensional sensor array 108 is configured to generate image data in response to incident x-rays 101. For example, the two-dimensional sensor array 108 may include sensors such as direct conversion sensors, indirect conversion sensor, an amorphous silicon (a-Si) based imaging array a complementary metal oxide semiconductors (CMOS) based imaging array, a photon counting imaging array, or the like. The two-dimensional sensor array 108 may include a scintillator or x-ray conversion materials such as gadolinium oxysulfide ($Gd_2O_2S$; GOS; Gadox), gadolinium oxysulfide doped with terbium ($Gd_2O_2S$: Tb), cesium iodide (CsI), or the like. The direct conversion sensor may include x-ray conversion materials and/or semi-conducting materials such as cadmium telluride (CdTe). Although some materials have been used as examples, in other embodiments, the material may be different. The two-dimensional sensor array 108 may include electronic circuits such as readout circuits, communication circuits, processing circuits, or the like.

The plastic housing 102 is a structure formed from a material such as impact-resistant plastic, non-impact resistant plastic, polycarbonate, acrylic, or the like. Plastic includes a wide range of synthetic or semi-synthetic materials that use polymers as a main ingredient. The plastic housing 102 is configured to support various other components such as the front plate 104, the two-dimensional sensor array 108, antennas, batteries, or the like. These and/or other components may be part of the x-ray detector 100a.

The plastic housing 102 may include internal structural features such as ribs, depressions, grooves, posts, or the like to provide rigid and semi-rigid support to the housing. The plastic housing 102 may be formed in a variety of ways, such as molding, welding, gluing, or the like of various components. In a specific example the plastic housing 102 is formed by injection molding. The plastic housing 102 may include sidewalls 102a and a base 102b.

In some embodiments, the two-dimensional sensor array 108 is supported within the plastic housing 102. For example, standoffs, structures of the plastic housing 102, or the like may support the two-dimensional sensor array 108 within the plastic housing 102.

The front plate 104 is connected to the plastic housing 102. The front plate 104 and the plastic housing 102 form an enclosure surrounding the two-dimensional sensor array 108. As will be described in further detail below, the enclosure may be completely sealed once the front plate 104 is attached to the plastic housing 102 while in other embodiments, other structure, such as screws with seals, electrical connectors or contacts, over-center cams, plastic hinges, cantilever snaps, hinge and pin connections, pressure sensitive adhesive, or the like may be included in completely sealing the enclosure.

The front plate 104 may include a conductive surface, layer, coating, material, or the like. For example, the front plate 104 may include a carbon fiber plate, material such as impact-resistant plastic, non-impact resistant plastic, polycarbonate, acrylic, or the like. A conductive material, such as aluminum or the like may be embedded within the carbon fiber plate, attached to a side of the structure, such as the inner side, or the like. As a result, a conductive surface may extend across the major plane of the front plate 104.

The plastic housing 102 includes a conductive coating 110. The conductive coating 110 and the front plate 104 are electrically connected together and form at least part of an electromagnetic interference shield around the two-dimensional sensor array 108. In some embodiments the conductive coating may include a conductive paint such as copper (Cu) paint, silver (Ag) paint, nickel (Ni) paint, an alloyed conductive paint, a mixture paint, or the like. In some embodiments, the conductive coating may be a sprayable conductive coating that may be applied in an aerosol form. In some embodiments, the conductive coating may include a mild solvent compatible with a solvent sensitive material, such as polycarbonate, or polycarbonate material. In some embodiments, the conductive coating may include an alcohol base, such as ethyl alcohol. In a particular example, the conductive paint may include a silver-coated copper. In some embodiments, the conductive coating may be less than 12 mil (12/1000 of an inch or 300 microns [μm]), 8 mil (200 μm), 4 mil (100 μm), 2 mil (50 μm), 1 mil (25 μm), or 0.5 mil (12 μm).

The use of the plastic housing 102 rather than a metal housing may increase a probability of electromagnetic interference (EMI) affecting circuitry such as the two-dimensional sensor array 108. EMI may be particularly troublesome for x-ray detectors 100a. For example, x-ray detectors 100a and, in particular, the two-dimensional sensor array 108 may be very sensitive to EMI. A voltage difference of on the order of millivolts (mV) may introduce an artifact into an image generated by the x-ray detector 100a. If an artifact is introduced, a patient may need to be exposed again to x-rays to generate another image, increasing the dose delivered to the patient. The conductive coating 110 can provide effective shielding of EMI. In some embodiments, the conductive coating may have a sheet resistance of less than 0.1 ohm/square ($\Omega/\square$), 0.05$\Omega/\square$, 0.025$\Omega/\square$, 0.015$\Omega/\square$, or 0.007$\Omega/\square$ per 25 μm or 1.0 mil. Sheet resistance is provided based on a 25 μm thickness, but can be lower with a thicker coating or higher with a thinner coating. In some embodiments, the conductive coating may have an electrical resistivity (ρ) of less than $5.0\times10^{-7}$ ohm meters ($\Omega$m), $3.75\times10^{-7}$ $\Omega$m, $1.1\times10^{-7}\Omega$m, $5.0\times10^{-8}\Omega$m, or $3.0\times10^{-8}\Omega$m at 20° Celsius (C).

The use of the plastic housing 102 rather than a metal housing may decrease a weight of the x-ray detector 100a. In some embodiments, the x-ray detector 100a may be a mobile device, such as a portable flat panel detector. The x-ray detector 100a may be moved from location to location, inserted into a bucky, or otherwise manipulated by a user. The reduced weight may reduce a strain on a user.

In some embodiments, the conductive coating 110 may have a thickness that is within a range. For example, the thickness range may be from about 100 micrometers (μm) to about 300 μm. The actual thickness may vary based on manufacturing tolerances, structural features of the plastic housing 102, or the like. In some embodiments, the thickness is about 100 μm. In some embodiments, a thickness of the material is determined by a desired level of EMI protection. For some EMI protection requirements, a thickness of 25 μm may be too thin, such as a level of EMI shielding for the two-dimensional sensor array 108. In addition, a coating that is too thick, such as greater than 300 μm may result in flaking. In some embodiments, depositing a layer of the conductive coating that is about 200 μm may reduce or eliminate flaking while still providing a sufficient level of EMI protection for the two-dimensional sensor array 108.

In some embodiments, the conductive coating 110 extends across all or substantially all internal surfaces of the plastic housing 102. In other embodiments, the conductive coating 110 may have gaps that are small enough such that EMI is still sufficiently reduced. In other embodiments, gaps may be present in the conductive coating 110 on various features of the plastic housing 102 for attachment of structural components, connectors, contacts, interfaces, or the like. As will be described in further detail below, a conductive material such as copper tape (e.g., copper foil shielding tape) may be applied over such features to mask the gap.

Figure 2:
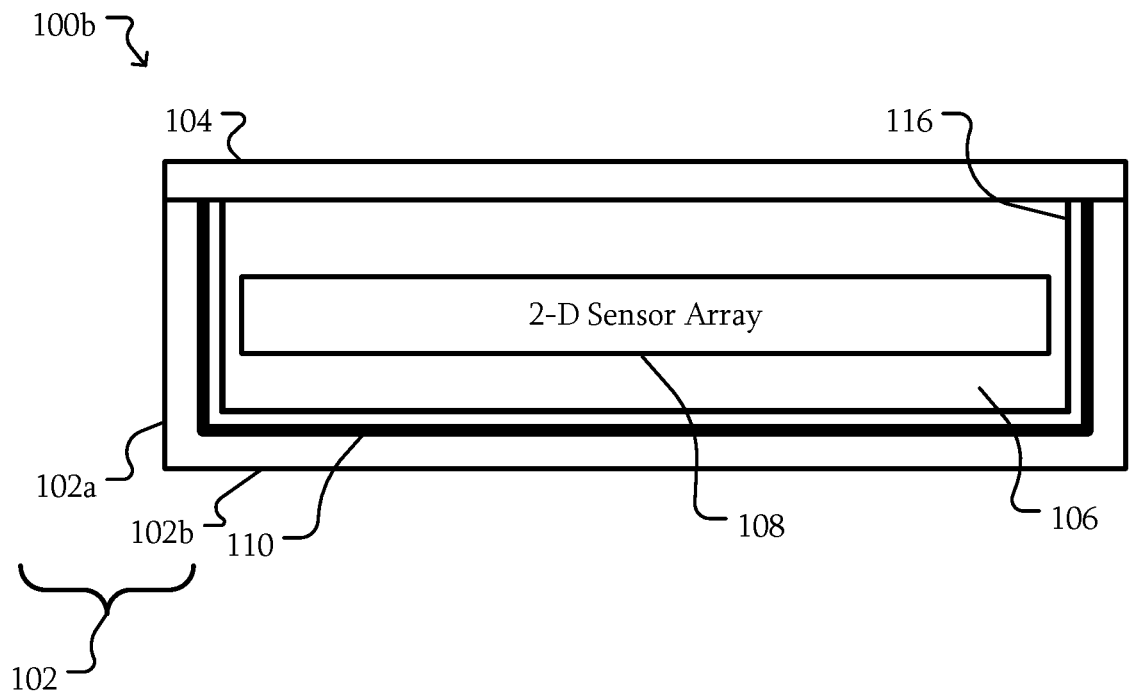
FIG. 2 is a block diagram of an x-ray detector with a plastic housing with a coating according to some embodiments.

FIG. 2 is a block diagram of an x-ray detector with a plastic housing with a coating according to some embodiments. In some embodiments, the x-ray detector 100b may be similar to the x-ray detector 100a or the like. However, a coating 116 may be deposited on at least part of the conductive coating 110. The coating 116 may reduce a probability that the conductive coating 110 may flake. Thus, the use of the coating 116 may maintain the EMI shielding performance of the conductive coating 110. The coating 116 may not be present over regions of the conductive coating 110 where contact to the conductive coating 110 is formed. The coating 116 may include a clear coat paint including polyurethane, acrylic, or the like. In some embodiments, the coating 116 may be translucent or opaque.

Figure 3:
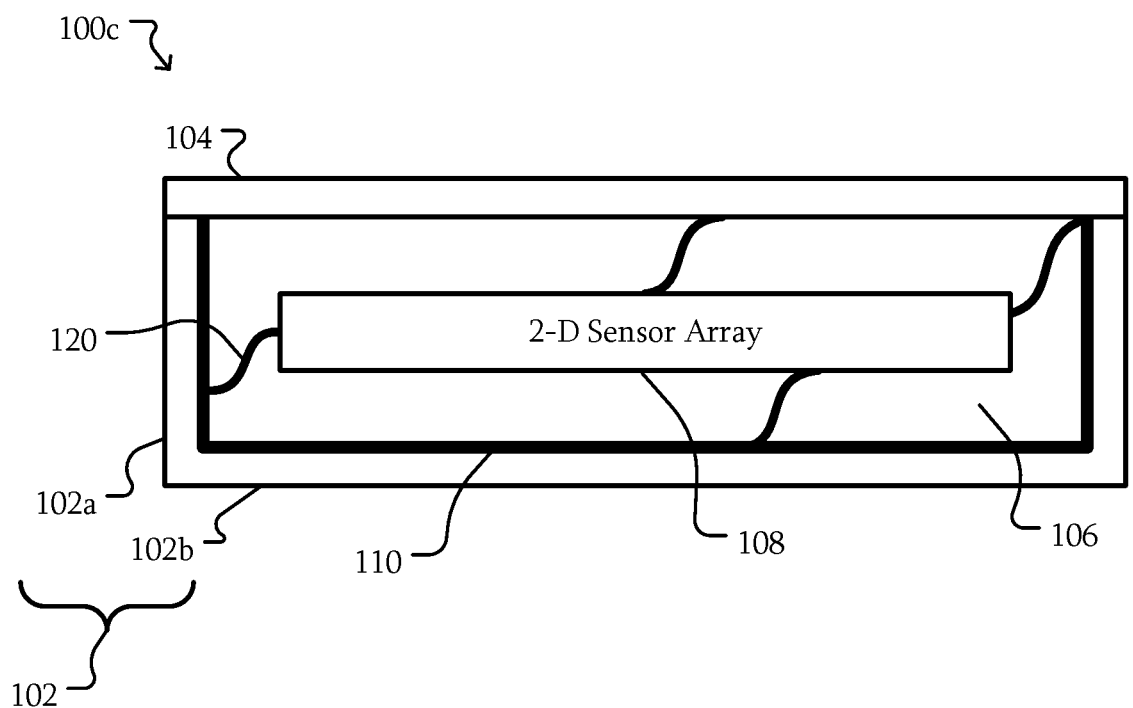
FIG. 3 is a block diagram of an x-ray detector with a plastic housing with multiple electrical connections to an electromagnetic interference shield according to some embodiments.

FIG. 3 is a block diagram of an x-ray detector with a plastic housing with multiple electrical connections to an electromagnetic interference shield according to some embodiments. In some embodiments, the x-ray detector 100c may be similar to the x-ray detectors 100a-100b or the like. However, conductive straps 120 may electrically connect the conductive coating 110 to the two-dimensional sensor array 108. For example, various ground terminals, contacts, or the like on the two-dimensional sensor array 108 may be electrically connected to the conductive coating 110 and/or the front plate 104 through the conductive straps 120. While four conductive straps 120 are used as an example, in other embodiments, two, three, or five or more conductive straps 120 may electrically connect the two-dimensional sensor array 108 to the conductive coating. The number of conductive straps 120 may be based on the desired degree of grounding for the two-dimensional sensor array 108.

In addition, while different locations for the connection of the conductive straps 120 have been used as examples, in other embodiments, the locations may be different. For example, the connection may be made to screw terminals of the plastic housing 102 that are coated with the conductive coating 110. The conductive straps 120 may be electrically connected to various regions of the conductive coating 110 on the plastic housing such as the sidewalls 102a and the base 102b.

The conductive straps 120 may take a variety of forms. For example, the conductive straps 120 may include copper tape, wires, braided conductors, or the like. In some embodiments, the conductive straps 120 may be electrically connected to one or more of the conductive coating 110, the two-dimensional sensor array 108, and/or the front plate 104 using conductive adhesive, such as an electrically conductive epoxy, electrically conductive acrylic adhesive, or the like.

Figure 4:
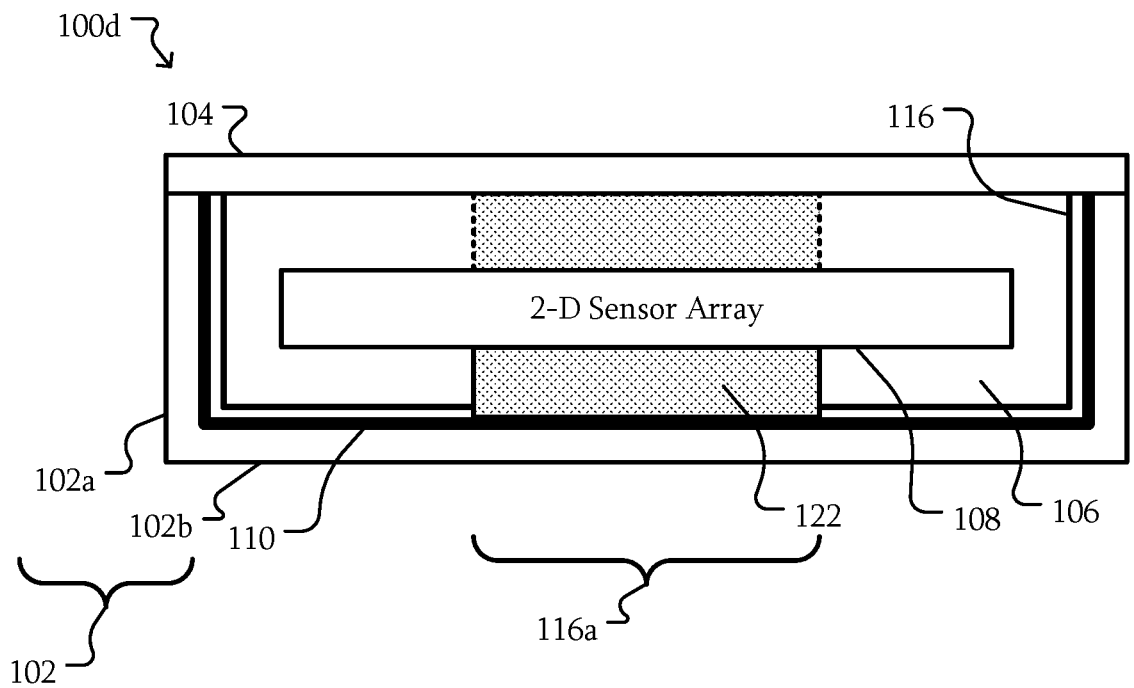
FIG. 4 is a block diagram of an x-ray detector with a plastic housing with conductive elastically deformable material according to some embodiments.

FIG. 4 is a block diagram of an x-ray detector with a plastic housing with conductive elastically deformable material according to some embodiments. In some embodiments, the x-ray detector 100d may be similar to the x-ray detectors 100a-c or the like. However, a conductive elastically deformable material 122 is electrically connected between the two-dimensional sensor array 108 and at least one of the conductive coating and the front plate. As illustrated, the conductive elastically deformable material 122 is disposed between the two-dimensional sensor array 108 and the base 102b of the plastic housing 102. The conductive elastically deformable material 122 may be compressed when installed to make contact with both the conductive coating 110 and conductive contacts of the two-dimensional sensor array 108.

In some embodiments, when a coating 116 is present, a gap 116a may be present in the coating 116 to allow electrical contact to the conductive coating 110 by the conductive elastically deformable material 122.

The conductive elastically deformable material 122 may take a variety of forms. For example, the conductive elastically deformable material 122 may include an open-cell foam with metal coated fibers. In another example, the conductive elastically deformable material 122 may include an anisotropic conductive film, an isotropic conductive adhesive, or the like.

Figure 5:
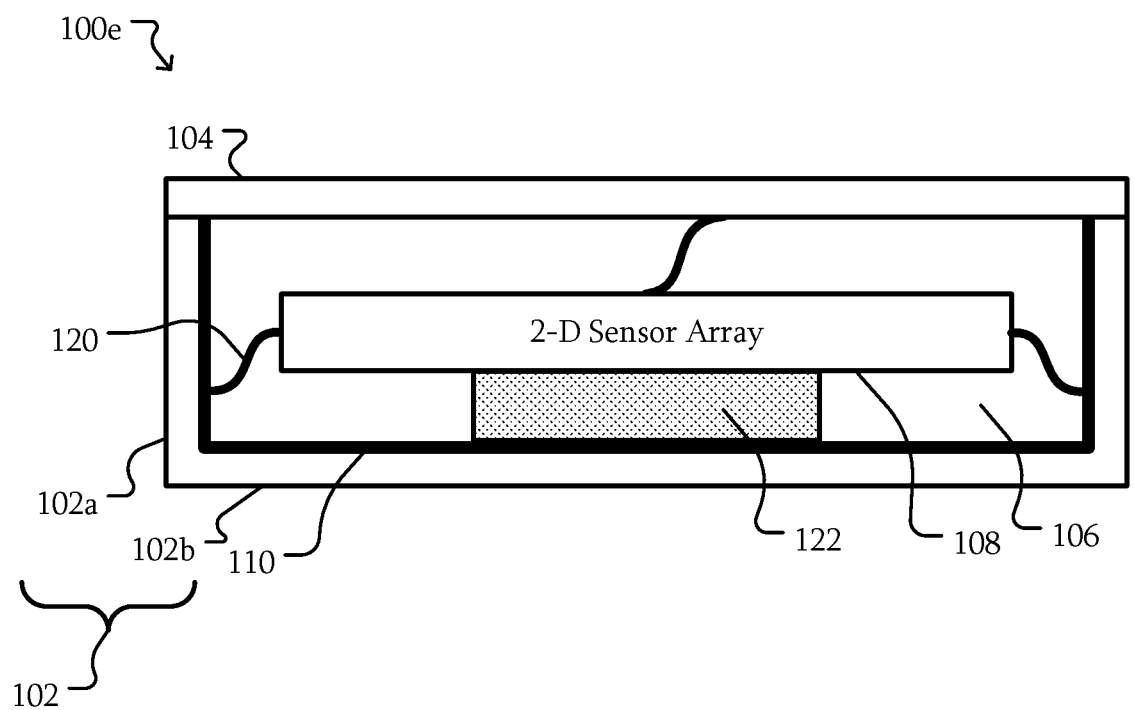
FIG. 5 is a block diagram of an x-ray detector with a plastic housing with multiple electrical connections to an electromagnetic interference shield and conductive elastically deformable material according to some embodiments.

FIG. 5 is a block diagram of an x-ray detector with a plastic housing with multiple electrical connections to an electromagnetic interference shield and conductive elastically deformable material according to some embodiments. In some embodiments, the x-ray detector 100e may be similar to the x-ray detectors 100a-d or the like. However, the both the conductive straps 120 and the conductive elastically deformable material 122 may be used to electrically connect the two-dimensional sensor array 108 to the EMI shield. Having multiple points of contact distributes the grounding load across the conductive coating 110. As a result, a lower thickness of the conductive coating 110 as compared to a metal housing may have a reduced impact on performance.

Figure 6A:
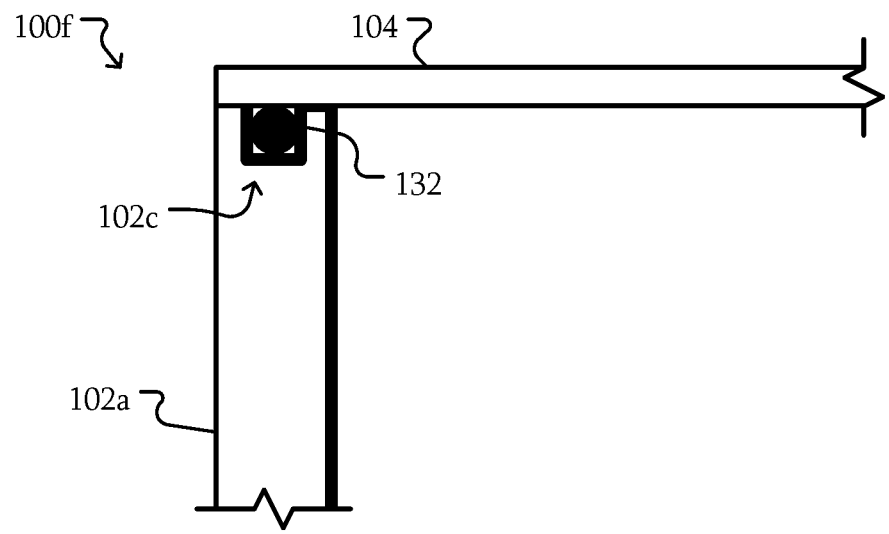
FIGS. 6A-6B are block diagrams of x-ray detectors with a plastic housing and a conductive gasket according to some embodiments.
Figure 6B:
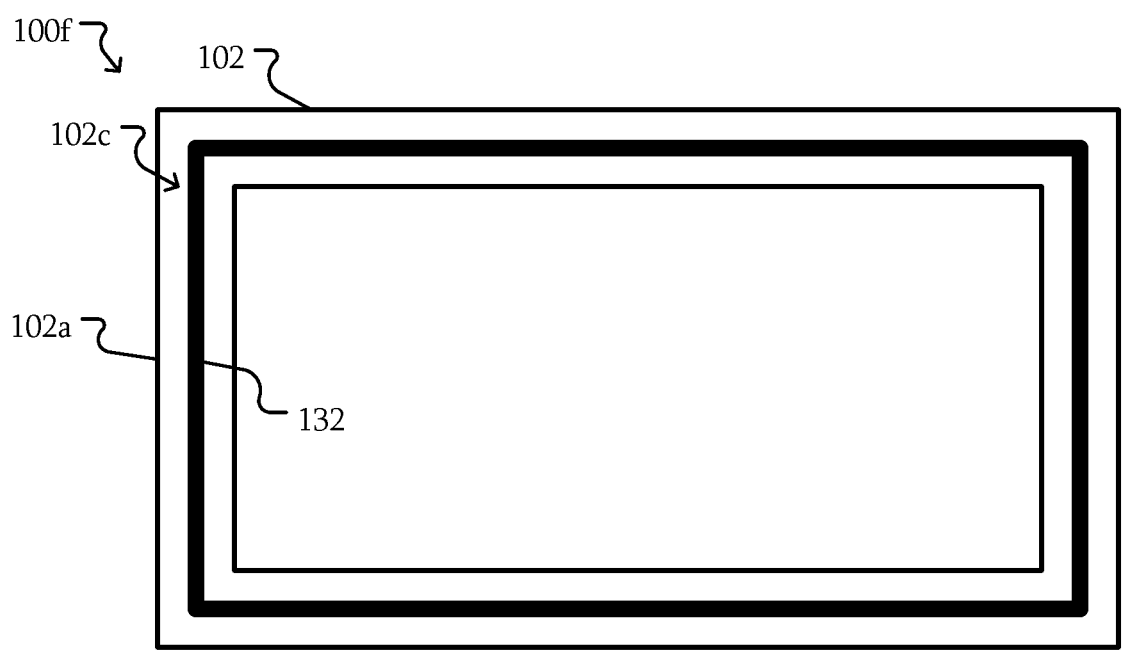

FIGS. 6A-6B are block diagrams of x-ray detectors with a plastic housing and a conductive gasket according to some embodiments. FIG. 6A is an expanded view of the interface between a sidewall 102a and the front plate 104. FIG. 6B is an overhead view of the plastic housing 102 without the front plate 104. Referring to FIGS. 6A and 6B, in some embodiments, the x-ray detector 100f may be similar to the x-ray detectors 100a-e or the like. However, a conductive gasket 132 is disposed between the front plate 104 and the plastic housing 102 and electrically connected to the front plate 104 and the conductive coating 110 and sealing an interface between the front plate 104 and the plastic housing 102.

Here, the sidewall 102a of the plastic housing has a groove 102c that is continuous around the perimeter of the plastic housing 102. The conductive coating 110 may extend into the groove. The conductive gasket 132 is disposed in the groove 102c such that when the front plate 104 is attached to the plastic housing 102, the conductive gasket 132 is compressed and makes contact to both the front plate 104 and the conductive coating 110.

While a groove 132 has been used as an example, in other embodiments, the conductive gasket 132 may take different forms. For example, the conductive gasket 132 may include a conductive sheet formed to match the shape of the sidewalls 102a of the plastic housing. Regardless, the conductive gasket 132 may form an electrical connection around the perimeter of the plastic housing 102 to the front plate 104. This connection may maintain the EMI shield across the transition from the conductive coating 110 to the front plate 104.

The conductive gasket 132 may be formed from a variety of materials. In some embodiments, the conductive gasket 132 is formed from nickel, graphite, and silicon. In some embodiments, the conductive gasket 132 may include a conductive elastomer. For example, the conductive gasket 132 may use a fluorosilicone binder.

Figure 7A:
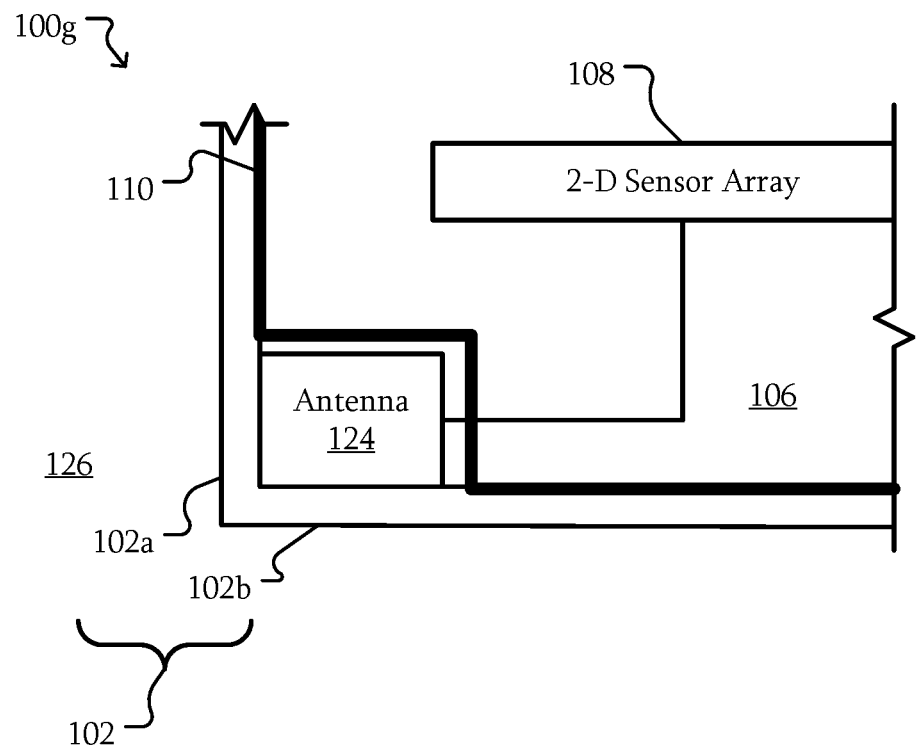
FIGS. 7A-7B are block diagrams of x-ray detectors with a plastic housing and an antenna according to some embodiments.
Figure 7B:
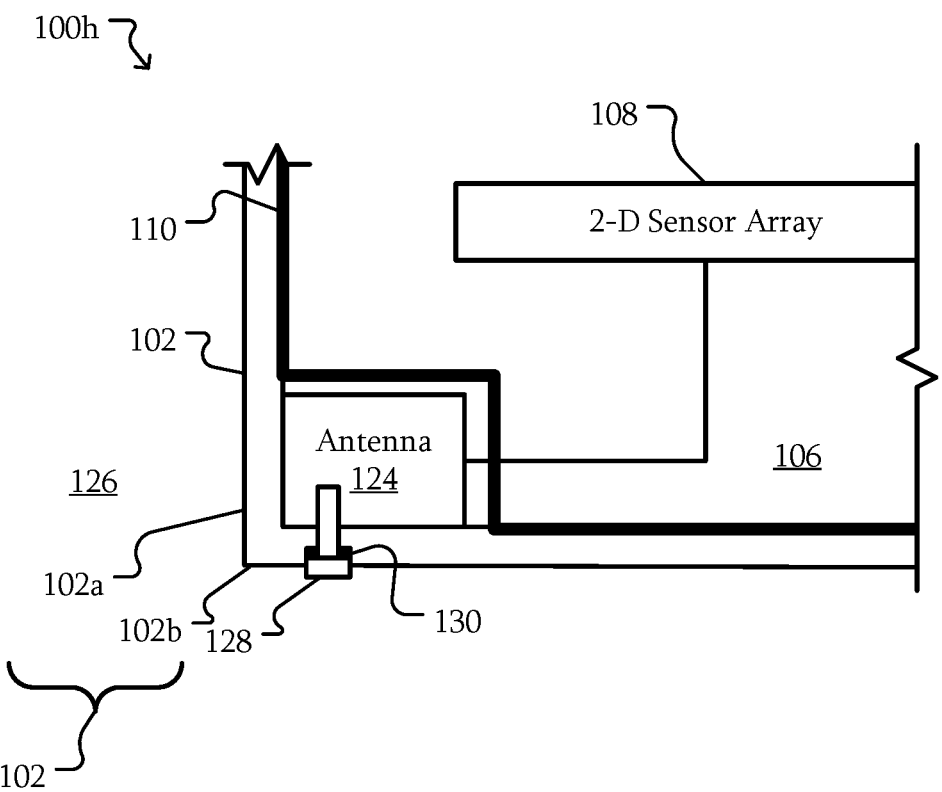

FIGS. 7A-7B are block diagrams of x-ray detectors with a plastic housing and an antenna according to some embodiments. Referring to FIGS. 7A, In some embodiments, the x-ray detector 100g may be similar to the x-ray detectors 100a-f or the like. However, the x-ray detector 100g includes an antenna 124 electrically connected to the two-dimensional sensor array 108. The antenna 124 may allow for wireless communications between the x-ray detector 100g and an external computer. For example, the antenna 124 may be an antenna for WiFi (i.e., Institute of Electrical and Electronics Engineers (IEEE) 802.11-2020 or earlier), Bluetooth (e.g., IEEE 802.15.1 or Bluetooth 5.2 or earlier), or other wireless communication standards.

However, for the antenna 124 to be able to transmit wireless signals, the antenna 124 should be outside of the EMI shield. Accordingly, the conductive coating 110, conductive tape, a metal housing, or the like may surround the antenna 124 on the enclosure 106 side of the antenna 124. Although the conductive coating 110 is illustrated as being disposed on the antenna 124, the conductive material forming the EMI shield in the region around the antenna 124 may be formed by a combination of conductive structures as described above. As a result, the EMI shield may be continuous and allow for the antenna 124 to be outside of the EMI shield.

In some embodiments, the antenna 124 is disposed within the enclosure 106 such that a wall of the plastic housing 102 is disposed between the antenna 124 and a region 126 external to the enclosure 106. In this example, both the sidewall 102a and the base 102b are disposed between the antenna 124 and the external region 126. In particular, the antenna 124 is within the plastic housing 102. In some embodiments, there is no access to the antenna 124. That is, there is no opening, door, hatch, or the like through which the antenna 124 may be accessed through the local region of the plastic housing 102. As will be described in further detail below, this lack of access may aid in sealing the enclosure 106.

In some embodiments, using a plastic housing 102 allows for easier placement of the antenna 124. In some embodiments, the antenna 124 may be disposed along an edge of the plastic housing 102. However, the lack of a need for access to the antenna 124 or a separate structure to seal the antenna 124, such as a plastic cover on a metal housing, allows for the antenna 124 to be moved to any desired position without considering where such access may need to be created in the plastic housing 102, as the plastic housing does not impede radio or wireless transmissions.

Referring to FIGS. 7A and 7B, in some embodiments, the antenna 124 may be attached to the housing in different ways. In the x-ray detector 100g, the antenna 124 may be attached to the plastic housing 102 using adhesive, fasteners that do not fully penetrate the plastic housing 102, or the like. Access to attach the antenna 124 may be wholly within the plastic housing 102.

In other embodiments, in the x-ray detector 100h, the antenna 124 may be attached to the plastic housing 102 using fasteners 128, such as screws, bolts, or the like. In some embodiments, a seal 130 may be disposed between the fastener 128 and the plastic housing 102.

In some embodiments, the various features described above may contribute to a better performance with respect to ingress. Referring back to FIGS. 1, 6A, and 6B, in some embodiments, the plastic housing 102 is a continuous structure with only a first opening configured to receive the front plate 104. For example, the plastic housing 102 may have only one opening that is sealed by the gasket 132 and front plate 104.

In other embodiments, the plastic housings 102 described herein may have other openings. However, the number of openings and their character may be reduce a probability of infiltration of dust, water, or the like. Conventional x-ray detectors may be capable of meeting an Ingress Protection Code level of IP56 where the x-ray detector may be protected somewhat from dust (e.g., dust protected with limit ingress) and water jets (e.g., 12.5 mm nozzle water spray from any direction). Ingress Protection Code level refers to the protection against solid ingress represented by the first digit (e.g., 5 in IP56) and liquid ingress represented by the second digit (e.g., 6 in IP56). However, the x-ray detector with an IP56 cannot be submerged in a liquid, such as water. An x-ray detector 100 as described herein may meet or exceed Ingress Protection Code level of conventional x-ray detectors with an ingress of IP57 (where 7 refers to immersion in water for 30 minutes at 1 meter), IP67 (where 6 refers to dust tight with no ingress of dust for 2 to 8 hours), or IP68 where the x-ray detector 100 is dust tight and the x-ray detector 100 may be submerged or immersed in 1 meter or more of water for at least 60 minutes).

Referring to FIG. 7A, when the antenna 124 is wholly within the plastic housing 102, an ingress point is eliminated. That is, conventional x-ray detectors may have a door, panel, or the like made of plastic that covers the antenna within a metal housing. This door is necessary as the metal housing would otherwise block wireless transmission from the antenna. In contrast, with the antenna 124 wholly within the plastic housing 102, no cover is needed to allow the antenna 124 to communicate wirelessly. Referring to FIG. 7B, even when fasteners 128 are accessible external to the plastic housing 102, the interface is much easier to seal using the seal 130 than an irregular, curved, or otherwise complex door or hatch covering an antenna. Moreover, as such a door or hatch must be relatively thin, the difficulty of sealing the interface with a metal housing is exacerbated.

Figure 8:
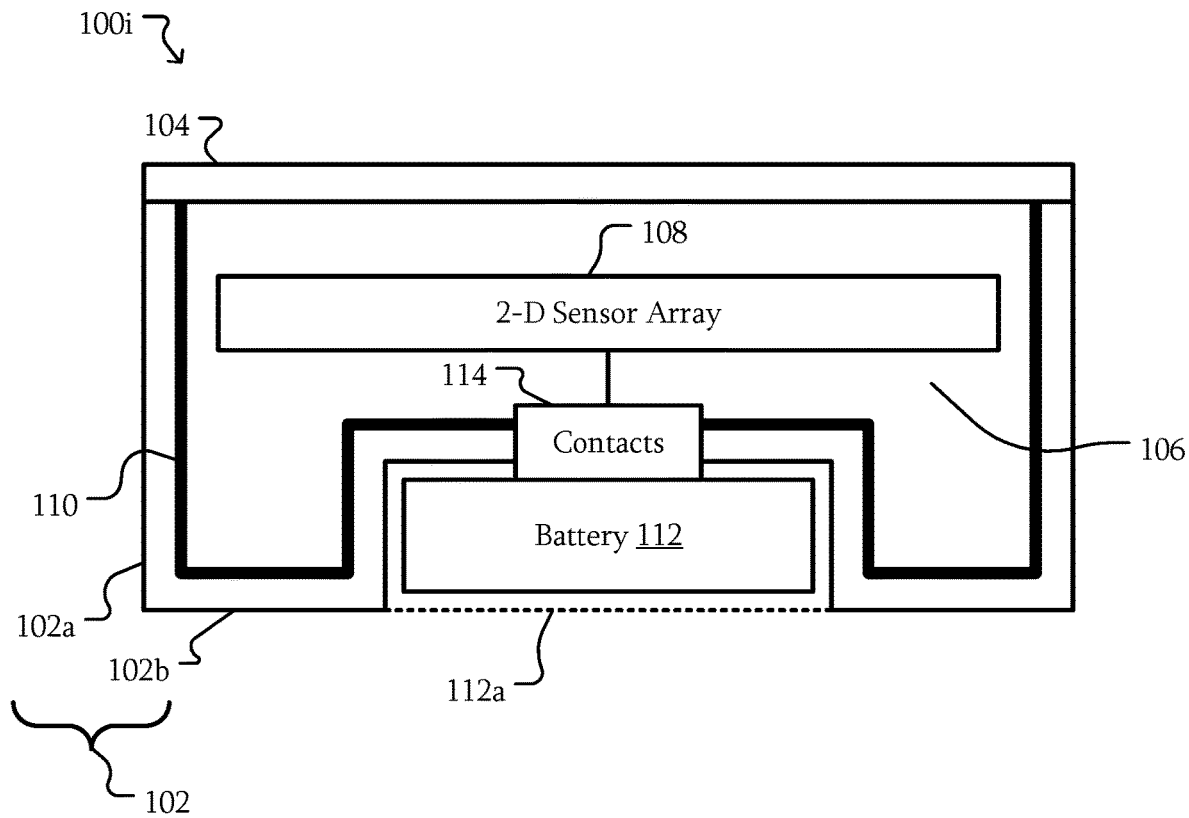
FIG. 8 is a block diagram of an x-ray detector with a plastic housing and a battery according to some embodiments.

FIG. 8 is a block diagram of an x-ray detector with a plastic housing and a battery according to some embodiments. In some embodiments, the x-ray detector 100i may be similar to the x-ray detectors 100a-h or the like. However, an externally accessible battery 112 may be part of the x-ray detector 100i. The battery 112 may be connectable to the two-dimensional sensor array 108 through contacts 114. The contacts 114 may penetrate the plastic housing 102. In some embodiments, a battery door 112a may conceal the battery 112 within the x-ray detector 100I.

In some embodiments, the plastic housing 102 may be a continuous structure with a first opening configured to receive the front plate 104 as described above. The only other opening in the plastic housing 102 may include an opening in which the contacts 114 to form an electrical connection between the battery 112 and the two-dimensional sensor array 108 are disposed. For example, the battery contacts 114 may include pogo pins in a header or other structure. That structure may be sealed to the plastic housing 102 at that opening. For example, U.S. patent application Ser. No. 16/730,953 ("'935 Application"), entitled "Removable Battery Connector Adapter," filed on Dec. 30, 2019, which is incorporated by reference in its entirety, provides an example of battery contacts 114 being sealed with a metal housing, which can also be used with a plastic housing 102.

Although the battery contacts 114 have been described as an example of an electrical connection that passes through the plastic housing 102, in other embodiments, other electrical connections may pass through. For example, a service port, ad universal serial bus port, a power connector, or the like may be present. Each of these connectors, ports, or the like may be formed to create a seal in the corresponding opening in the plastic housing 102. However, the number of seals, potential locations for ingress of dust and/or water, or the like may be reduced. In addition, the geometry of such penetration of the plastic housing 102 and the seals may be less complex, decreasing a probability of a failure of the seal. A gap of as small as 1 µm may allow in water or dust. The simplified geometry of the interfaces may increase a probability that such gaps do not occur. In some embodiments, the battery 112 may be sealed to the plastic housing 102. U.S. Pat. No. 9,269,935 ("'935 Patent"), entitled "Battery Pack with Integral Seal Member and Electronic Device Including the Same," granted on Feb. 23, 2016, which is incorporated by reference in its entirety, provides an example of the battery 112 being sealed to a metal housing, which can also be used with a plastic housing 102.

Figure 9A:
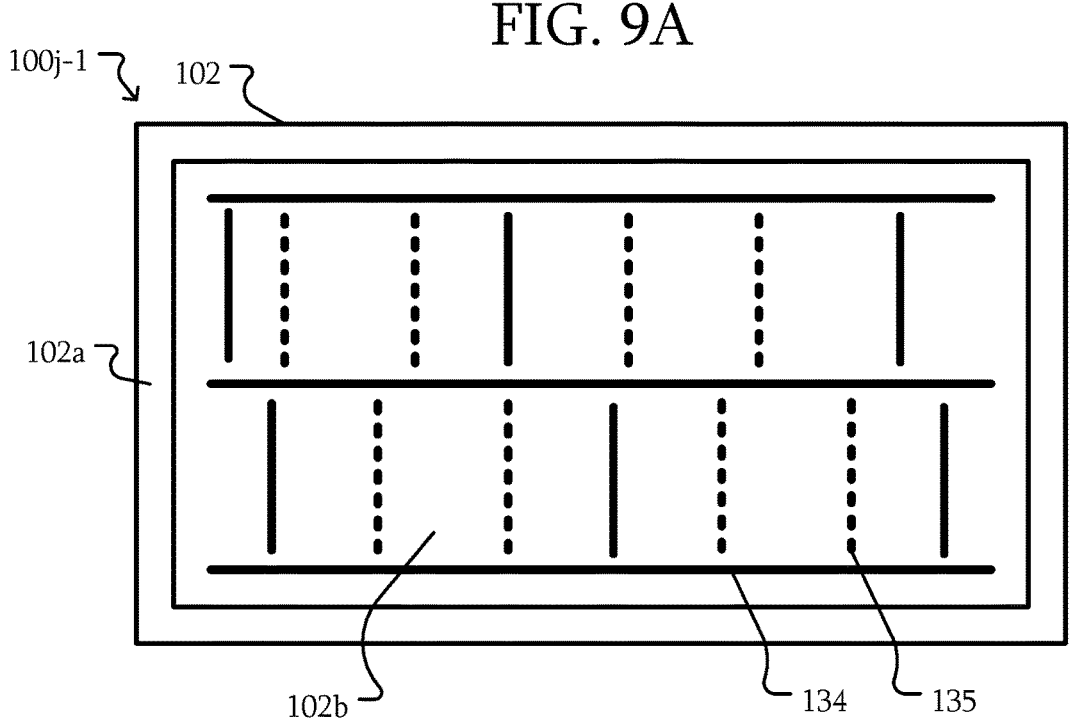
FIG. 9A-9C are block diagrams of an x-ray detector with a plastic housing with at least one rigid component according to some embodiments.
Figure 9B:
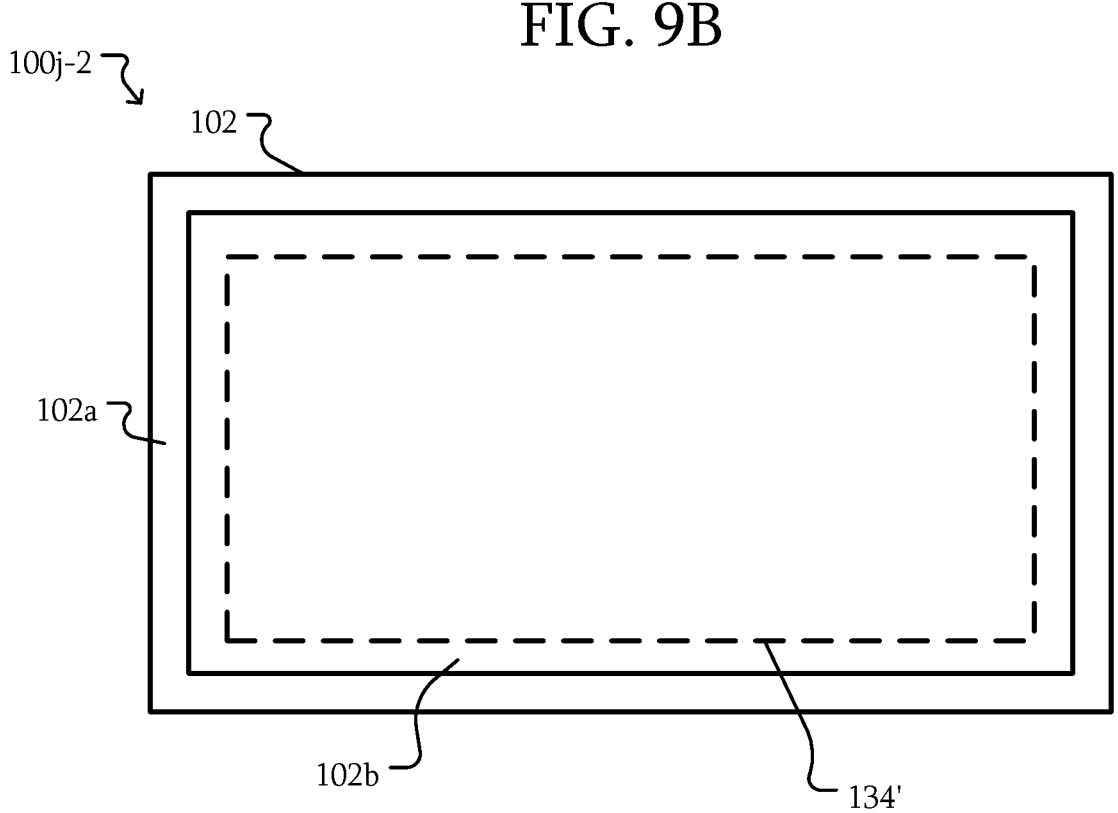
Figure 9C:
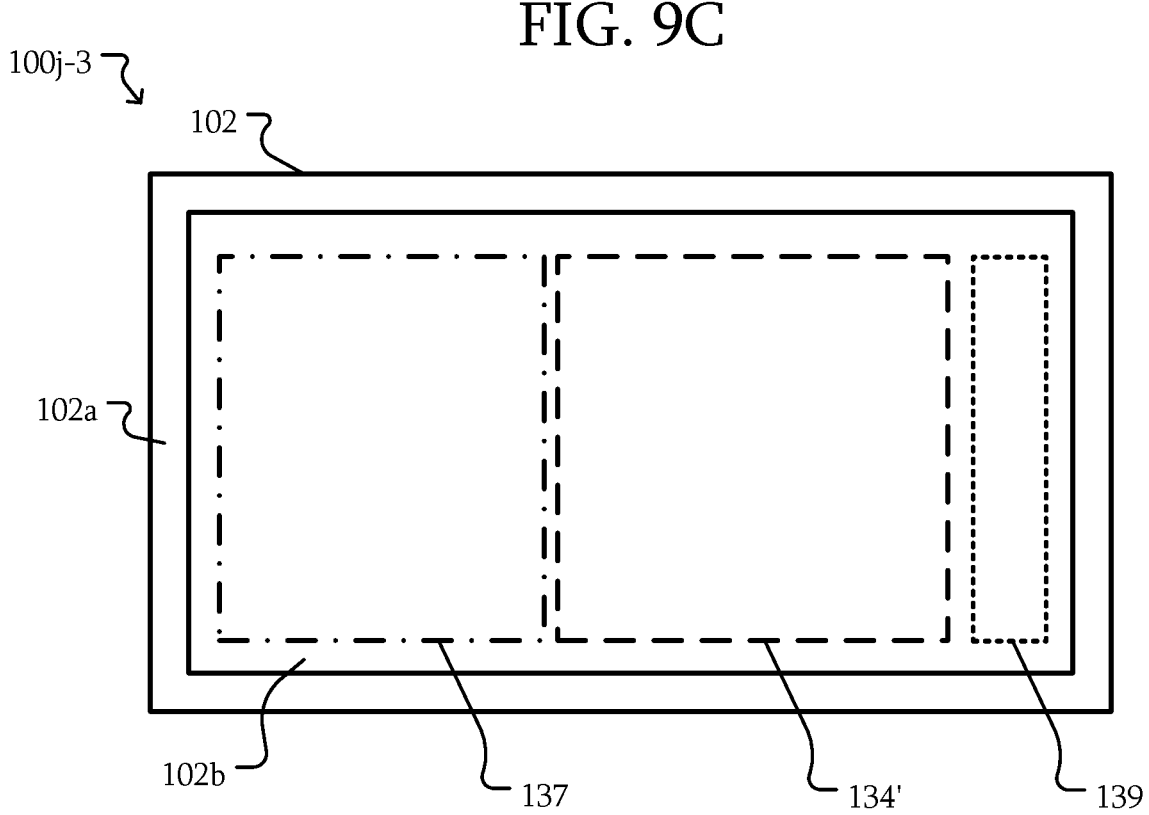

FIG. 9A-9C are block diagrams of an x-ray detector with a plastic housing with at least one rigid component according to some embodiments. Referring to FIG. 9A, in some embodiments, the x-ray detector 100j-1 may be similar to the various x-ray detectors 100a-i described above. However, in the x-ray detector 100j-1, at least one rigid component 134 is attached to the plastic housing 102. The rigid component 134 may include a variety of forms, such as a bar, a beam, a rod, a plate, or the like.

In some embodiments, multiple rigid components 134 may be present. Here, nine rigid components 134 are used as an example. However, in other embodiments, the number and placement of the rigid components 134 may be different.

The rigid components 134 may be formed of a material that is mechanically stronger that plastic. For example, the rigid components 134 may be formed of carbon fiber, metal, or the like.

In some embodiments, ribs 135 or other similar structures may be formed as part of the plastic housing 102. That is, in various locations, a strip or other shape of plastic may extend from the base 102b. While the ribs 135 may increase a rigidity of the plastic housing 102, the increase may not be sufficient to achieve a desired rigidity. In some embodiments, the rigid components 134 may be added in conjunction with the ribs 135 to increase the rigidity.

In some embodiments, using the rigid components 134 may increase the static load the x-ray detector 100j-1 may handle. For example, the increase may be about 50% or more. In a particular example, conventional x-ray detectors may have a point static load limit of about 100 kilograms (kg) and a distributed static load limit of 150 kg. Adding the rigid components 134 may increase the static load limits to 200 kg and 300, kg, respectively.

In some embodiments, the rigid components 134 may be distributed across the plastic housing 102 such that the rigid components 134 are evenly or uniformly spaced. Accordingly, the load transferred to the rigid components 134 may be substantially evenly distributed. However, in other embodiments, the rigid components 134 may be irregularly spaced, spaced to accommodate other internal structures, or the like.

Referring to FIG. 9B, in some embodiments, the x-ray detector 100j-2 may include a plate 134' as a rigid component 134. The plate 134' may cover an area of the base 102b of the plastic housing 102 that is greater than 50% of the area of the base 102b. While the plate 134' is illustrated as a single component in a particular position and having a particular shape, in other embodiments, the plate 134' may be multiple plates, may have different shapes and may be in different positions or orientations.

In some embodiments, the plate 134' may be disposed on the base 102b in a region overlapping with a printed circuit board 1202 as will be described in further detail below.

In some embodiments, the plate 134' may have a thickness that is less than that of the base 102b. For example, the base 102b may have a thickness of about 1 millimeter (mm), from about 1 mm to 2 mm, or the like. The plate 134' may have a thickness of about at least 0.3 mm, from about 0.3 mm to about 1 mm, or the like. An example of such a thinner plate 134' may include a carbon fiber plate.

Referring to FIG. 9C, in some embodiments, the plate 134' may thicker than the base 102b. For example, the plate 134' may include a plastic material. The plate 134' may be thicker than the base 102b by a factor of 2, 3, 4, or more. In some embodiments, the plate 134' may have a thickness that results in a height that is substantially the same as an adjacent structure of the base 102b. For example, the base 102b may include a portion 137 configured to receive a battery. The plate 134' may be disposed adjacent to the portion 137 and having a thickness such that the plate 134' is at substantially the same level as the corresponding portion 137 configured to receive the battery. As a result, a ridge between the plate 134' and the portion 137 configured to receive the battery may be reduced or eliminated, thereby reducing or eliminating a point load from such a structure on other components such as the two-dimensional sensor array 108. The use of such as plate 134' may reduce a cost of the plastic housing 102 as forming a plastic housing 102 with a varying thickness may be more expensive.

In some embodiments, regions 139 of the base 102b without a plate 134', portion 137, or the like may include a foam or other resilient material at substantially the same height. As a result, the two-dimensional sensor array 108 may be adjacent to or contact a substantially flat surface, reducing a probability of damage due to a point load.

Figure 10A:
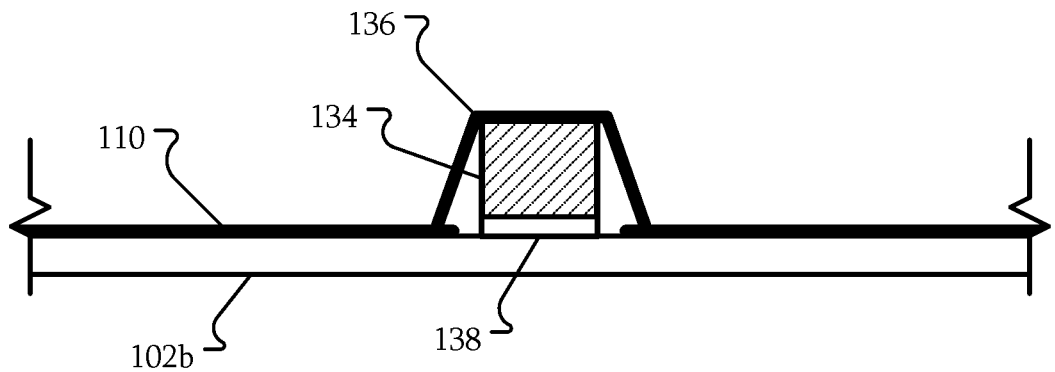
FIGS. 10A-10C are block diagrams of x-ray detectors with a plastic housing with at least one rigid component with conductive material according to some embodiments.
Figure 10B:
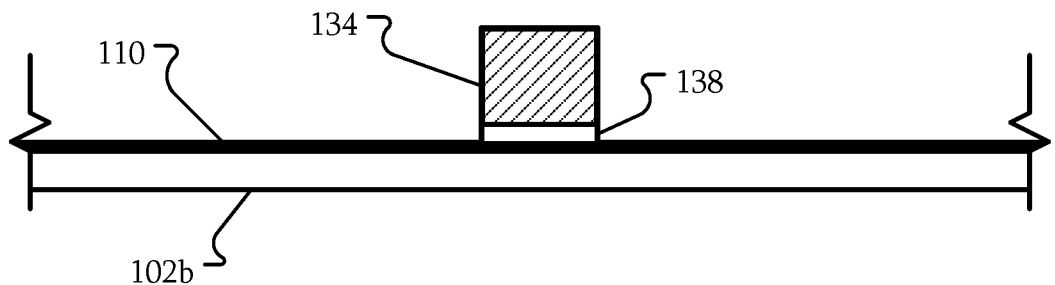
Figure 10C:
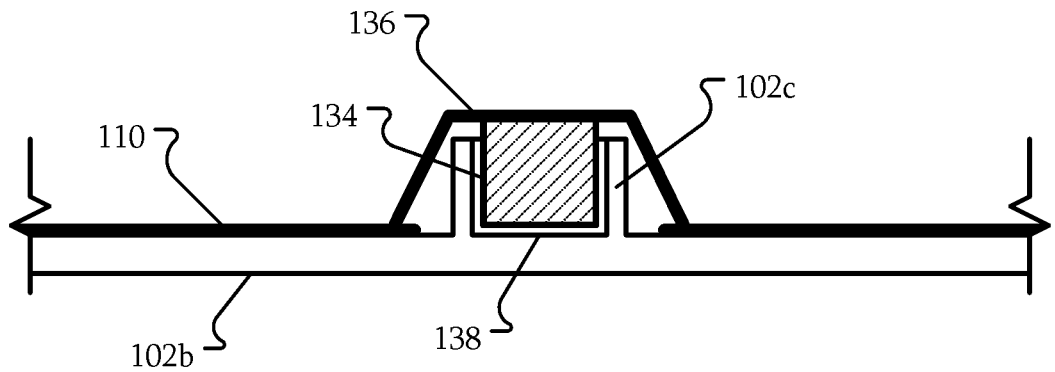

FIGS. 10A-10C are block diagrams of x-ray detectors with a plastic housing with at least one rigid component with conductive material according to some embodiments. While the cross section of the rigid component 134 shown in FIGS. 10A-10C is rectangular, the rigid component can have any type of cross section, such as elliptical, circular, triangular, polygonal, an I-beam, or the like. Referring to FIG. 10A, in some embodiments, the rigid component 134 may be attached directly to the plastic housing 102. Here, the rigid component 134 is attached to the base 102b of the plastic housing 102 by adhesive 138.

In some embodiments, the rigid component 134 may not be conductive. In addition, by directly attaching the rigid component 134 to the plastic housing 102, the non-conductive rigid component 134 may create a gap in an EMI shield. Accordingly, a conductive material 136 may be disposed on the rigid component 134 to cover the rigid component 134. The conductive material 136 may be electrically connected to the conductive coating 110. For example, the conductive material 136 may include conductive tape that covers the rigid component 134. In other embodiments, the rigid component 134 may be covered by a conductive epoxy. In other embodiments, the rigid component 134 may be covered by the conductive coating 110 itself.

In some embodiments, the conductive material covers all of a rigid component 134. In other embodiments, the conductive material 136 covers a sufficient amount of the rigid component 134 to maintain a desired level of EMI shielding.

Referring to FIG. 10B, in some embodiments, the rigid component 134 may be attached to the conductive coating 110. Here, the rigid component 134 is attached to the conductive coating 110 using the adhesive 138.

Referring to FIG. 10C, in some embodiments, the rigid component 134 may be embedded within a groove 102c or other structure of the plastic housing 102. The groove 102c may be similar to different from the ribs 135 described above. The rigid component 134 may be attached to the groove 102c using the adhesive 138. The rigid component 134, the groove 102c, and the like may be covered by the conductive material 136 similar to that described in FIG. 10A.

In the various embodiments described above, the rigid components 134 may be covered to maintain the EMI shield formed at least in part by the conductive coating 110 and the front plate 104.

Figure 11A:
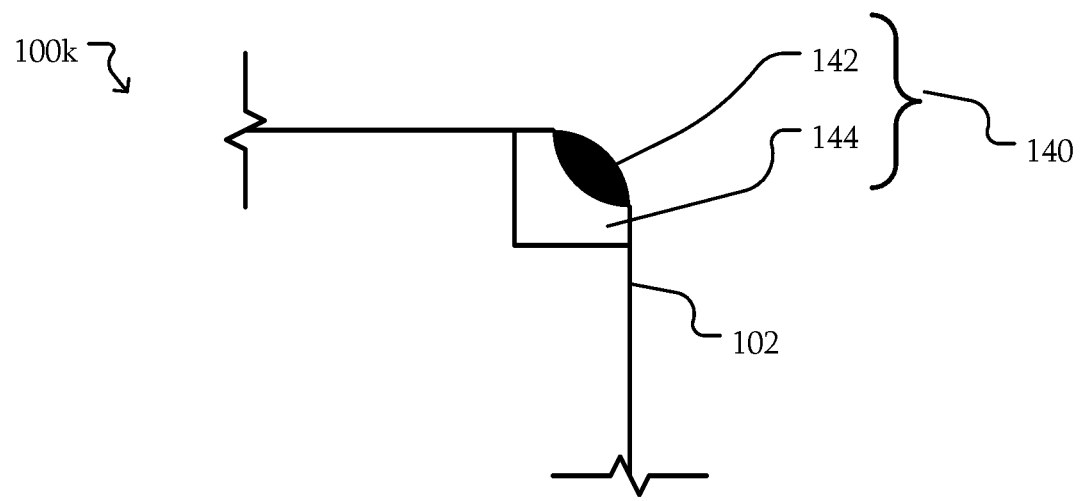
FIGS. 11A-11C are block diagrams of x-ray detectors with a plastic housing with corner bumpers according to some embodiments.
Figure 11B:
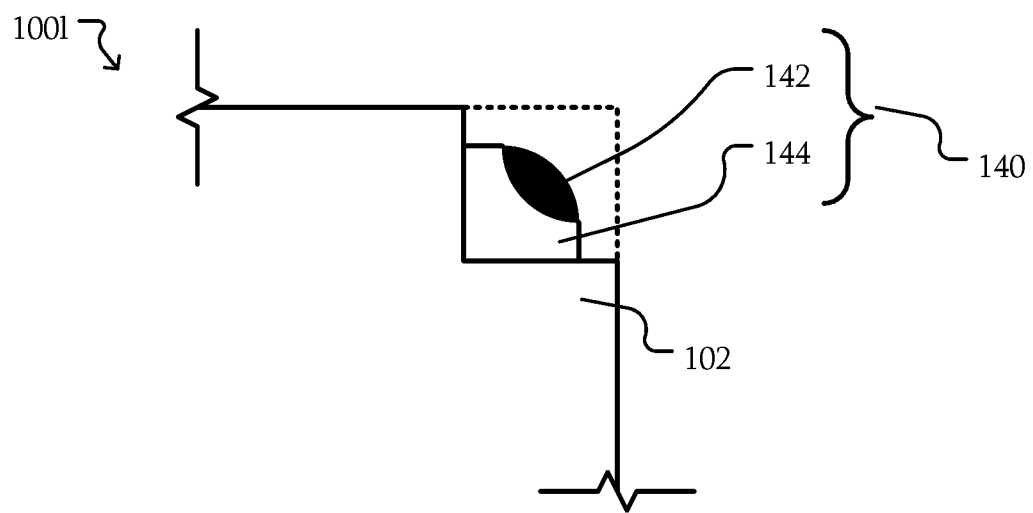
Figure 11C:
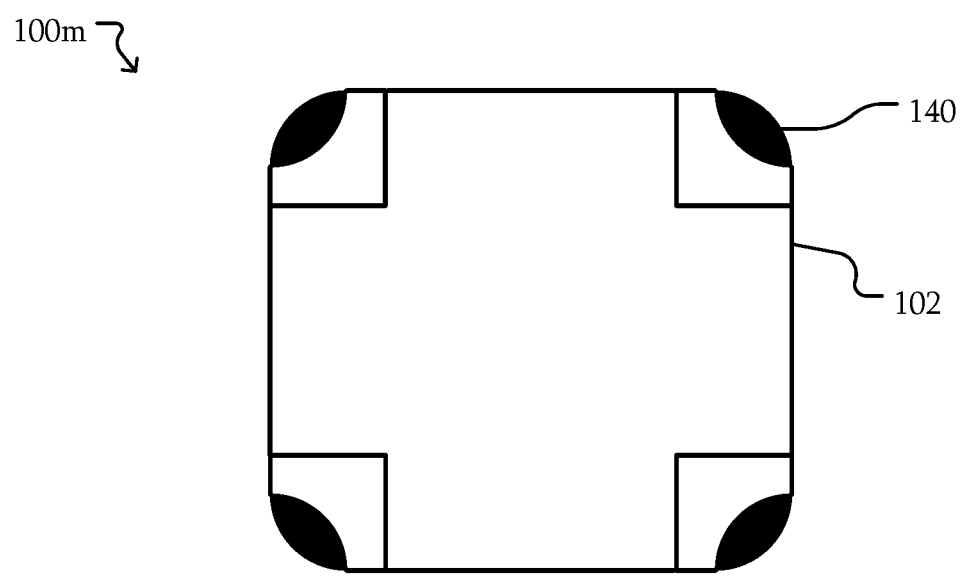

FIGS. 11A-11C are block diagrams of x-ray detectors with a plastic housing with corner bumpers according to some embodiments. Referring to FIG. 11A, in some embodiments, the x-ray detector 100k may be similar to the other x-ray detectors 100a-j described herein. However, the x-ray detector 100k includes at least one corner bumper 140. The corner bumper 140 is attached to the plastic housing 102. The corner bumper 140 includes a tip 142 and a body 144. The tip 142 is formed from a first material. The body 144 formed from a second material different from the first material. The tip 142 may be disposed at a distal end of the corner bumper 140 when installed on the plastic housing 102.

In some embodiments, the corner bumper 140 may be removably attached to the plastic housing 102. For example, a fastener (not illustrated) may attach the corner bumper 140 to the plastic housing 102. Thus, if the corner bumper 140 is damaged during an impact, the corner bumper 140 may be replaced.

In some embodiments, the first material may include a flexible material that may deform or spread under a load. In some embodiments, the first material may include an elastomeric plastic. In some embodiments, the first material of the tip 142 includes rubber. The first material may include a resilient material.

The second material may be more rigid than the first material. For example, the second material may include an impact-resistant plastic. The second material may be less likely to resiliently deform when under a load than to crack or fracture. In some embodiments, the second material may be similar or the same as the material of the plastic housing 102. In some embodiments, both the second material and the plastic housing 102 may include an impact-resistant plastic. However, in other embodiments, the second material may include the impact resistant plastic while the plastic housing 102 includes non-impact-resistant plastic.

The tip 142 and the body 144 may be integrally formed. For example, an overmold process may be used to mold the body 144 to the tip 142. As a result, a chemical bond may be formed between the two to transfer impacts between the two materials.

In some embodiments, the body 144 may include a sufficient amount of material to mount the corner bumper 140 to the plastic housing 102 and contain the tip 142 when deforming. The combination of the first and second materials may improve the impact resistance of the x-ray detector 100k. In particular, a resilient material may deform too much if used alone. Hard plastic may chip and bounce under an impact. The combination of the two may bounce somewhat, but the body 144 may contain the tip 142 and limit the deformation. As a result, the deformation of the tip 142 may lessen the impact but it may also be contained so that it does not deform enough to damage the front plate 104. For example, too much deformation of the tip 142 may contact the front plate 104 and cause delamination. By limiting the deformation, a probability of such delamination may be reduced or eliminated.

Referring to FIG. 11B, in some embodiments, the x-ray detector 100l is similar to the x-ray detector 100k. However, the corner bumper 140 does not extend beyond a rectangle coincident with each side of an outer perimeter of the plastic housing 102 in plan view. That is, the corner bumper 146 is slightly recessed into the plastic housing 102. As a result, when the x-ray detector 100l is placed in a bucky during use, the corner bumpers 140 may not interfere with the insertion. That is, the fit in the bucky may be controlled by the size of the x-ray detector 100l, not the size of the corner bumpers 140.

In some embodiments, the corner bumpers 140 are only disposed on the corners of the x-ray detector 100. However, in other embodiments, other similar structure may be formed on the sides of the x-ray detector 100, whether continuous along the side, continuous with the corner bumpers 140, periodically spaced, or the like.

Referring to FIG. 11C, in some embodiments, the x-ray detector 100m may be similar to the x-ray detector 100k or 100l. The x-ray detector 100m has a plastic housing 102 with a generally rectangular shape. The corner bumpers 140 may be disposed in the four corners of the plastic housing 102.

Figure 12:
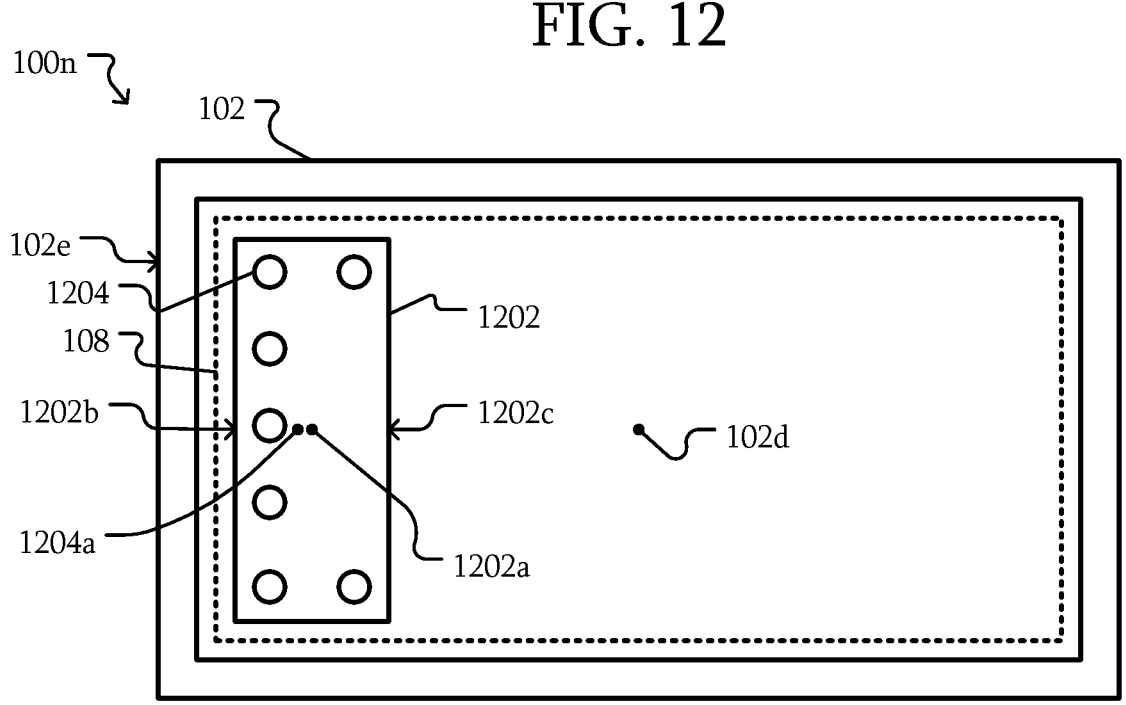
FIG. 12 is a block diagram of an x-ray detector with a plastic housing and a printed circuit board according to some embodiments.

FIG. 12 is a block diagram of an x-ray detector with a plastic housing and a printed circuit board according to some embodiments. The x-ray detector 100n may be similar to the x-ray detectors 100a-100m described above, including a plastic housing 102 and a two-dimensional sensor array 108. However, the x-ray detector 100n includes a printed circuit board (PCB) 1202.

The PCB 1202 may include various circuits such as readout circuits, amplifiers, analog to digital converters, processors, application specific integrated circuits (ASICs), or the like. The circuits may be configured to perform various operations on data received from the two-dimensional sensor array 108, configured to control the two-dimensional sensor array 108, configured to control other functions of the x-ray detector 100n, or the like.

The PCB 1202 includes multiple mount points 1204. The mount points 1204 are locations on PCB 1202 where the PCB 1202 is mounted to the plastic housing 102. Corresponding receiving points to the mount points 1204 on PCB 1202 are located on the plastic housing 102. The PCB 1202 may be mounted to the corresponding receiving points on the plastic housing 102 at the mount points 1204 using fasteners, standoffs, pins, clips, rivets, welds, or the like.

A centroid 1202a of the PCB 1202 is closer to a center 102d of the plastic housing 102 than a centroid 1204a of the mount points 1204. The centroid 1202a of the PCB 1202 may be determined by a determining a center of mass of the PCB 1202. The center of mass may be determined while assuming the PCB 1202 has a uniform density. Alternatively, the centroid 1202a of the PCB 1202 may be determined by determining the center of area of the major plane of the PCB 1202 or the projection of the PCB 1202 on to the major plane. The centroid 1204a of the mount points 1204 may be similarly determined. For example, the centroid 1204a of the mount points 1204 may be determined by averaging the locations of centers of the mount points 1204. In another example, the size of the mount points 1204 may be incorporated. The centroid 1204a of the mount points 1204 may also be based on the projection of the mount points 1204 on to the major plane of the PCB 1202. As a result, the mount points 1204 are further from the center 102d of the plastic housing 102 as a whole than the PCB 1202 itself.

In some embodiments, the plastic housing 102 has an ability to flex. The plastic housing 102 may subsequently return to its original shape. The design of the plastic housing 102 may intentionally allow for flexing. For example, the plastic housing 102 may include fewer to no internal structural features such as ribs, depressions, grooves, posts, or the like that would otherwise provide rigid or semi-rigid support. Similarly, the plastic housing 102 may include fewer to no rigid components such as rigid components 134 as described above. The flexing may increase a survivability of the x-ray detector 100n from being dropped at a higher height than a more rigid housing. Improved or increased survivability can indicate less or no damage for an equivalent or similar condition, such as being dropped.

The use of the mount points 1204 and their locations relative to the PCB 1202 allow the PCB 1202 to accommodate the increased flexing of the plastic housing 102. For example, an amount of flexing may decrease further from the center 102d of the plastic housing. As the centroid 1204a of the mount points 1204 is further from the center 102d of the plastic housing 102 than the centroid 1202a of the PCB 1202, the amount of flexing experienced by the PCB 1202 and strain and/or stress on the mount points 1204 fasteners will be less than if the mount points 1204 were uniformly distributed across the PCB 1202 or distributed on the PCB 1202 closer to the center 102d. The reduced flexing of the PCB 1202 increases a probability that components, traces, vias, layers, or the like of the PCB 1202 do not disconnect, delaminate, or otherwise change in a manner that affects the operation of the PCB 1202.

Accordingly, the x-ray detector 100n may tolerate greater flexing while still remaining operable after the flexing. An x-ray detector 100n may experience such increased flexing, for example, while being inserted or extracted from behind heavier patients.

Breakage due to flexing may be a significant failure mode of x-ray detectors. Even with increased structures to make an x-ray detector more rigid, the amount of protection may not be sufficient to prevent damage to components such as the two-dimensional array 108, the PCB 1202, or the like. Instead, the x-ray detector 102n leveraged the flexibility of the plastic housing 102 to absorb at least some of the energy that causes the x-ray detector 100n to flex. The PCB 1202 may be mounted in a manner that accommodates the flexing.

In some embodiments, the two-dimensional sensor array 108 includes a flexible substrate. For example, the flexible substrate of the two-dimensional sensor array 108 may include a polyamide, polyester, or polyethylene terephthalate (PET) film, or the like. Accordingly, the two-dimensional sensor array 108 may accommodate flexing of the plastic housing 102.

In some embodiments, a first number of the mount points 1204 are disposed along an edge 1202b of the PCB 1202 furthest from the center 102d of the plastic housing 102. In this example, the edge in "along an edge" for a given mount point 1204 means the edge that is closest to that mount point 1204. A second number of mount points 1204 are disposed along an edge 1202c of the PCB 1202 closest to the center 102d of the plastic housing 102. The first number is greater than the second number. In this example, five mount points 1204 are located along the edge 1202b while two mount points 1204 are located along edge 1202c; however, in other embodiments the number of mount points along either edge 1202b or 1202c may be different. As a result, the number of mount points 1204 that experience a greater amount of flexing of the plastic housing 102 may be less than the number of mount points 1204 that experience a lesser amount of flexing.

In some embodiments, the PCB 1202 is disposed along an edge 102e of the plastic housing 102. In some embodiments, "along the edge" means the PCB 1202 is immediately adjacent to the edge 102e with only a separation that accommodates mechanical tolerances of the plastic housing 102, the PCB 1202, or the like. In other embodiments, "along the edge" means the centroid 1202a of the PCB 1202 is closer to the edge 102e than the center 102d of the plastic housing 102. As a result, the PCB 1202 may experience less flexing than if the PCB 1202 was disposed closer to the center 102d.

In some embodiments, using the plastic housing 102 and the two-dimensional sensor array 108 with a flexible substrate may increase the point and distributed static load limits to 500 kg and 1000 kg, respectively.

Figure 13:
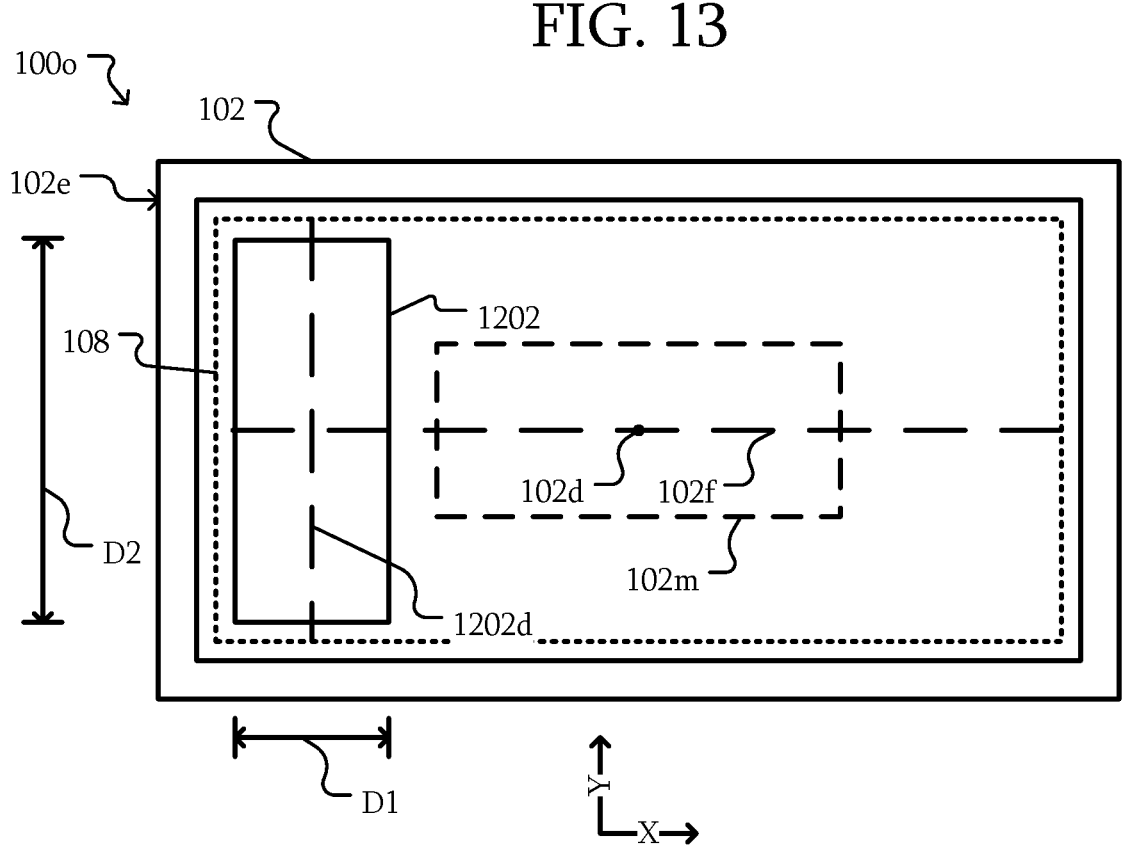
FIG. 13 is a block diagram of an x-ray detector with a plastic housing and a printed circuit board oriented according to some embodiments.

FIG. 13 is a block diagram of an x-ray detector with a plastic housing and a printed circuit board oriented according to some embodiments. In some embodiments, the x-ray detector 1000 may be similar to the x-ray detector 100n. A first dimension D1 of the PCB 1202 along an axis including the center 102d of the plastic housing 102 is less than a second dimension D2 of the PCB 1202 along a major axis 1202d of the PCB 1202. Here, the major axis 102f of the plastic housing 102 is used as an example; however, in other embodiments, the axis may be a minor axis. As a result, more of the surface of the PCB 1202 may be further from the center 102d than if the PCB 1202 was rotated 90 degrees. In some embodiments, the major axis 1202d of the PCB 1202 may be perpendicular to the major axis 102f.

In some embodiments, the PCB 1202 may also be disposed to be outside of a central area 102m of the plastic housing. The central area 102m the central half of the width of the plastic housing 102 in both the X and Y axes. That is, the central area 102m begins one quarter of the distance along the X and Y axes inside of the outer perimeter of the plastic housing 102. The PCB 1202 may be disposed in a region of the plastic housing 102 that is within the first quarter or the fourth quarter of the plastic housing 102 in both the X and Y axes.

Figure 14:
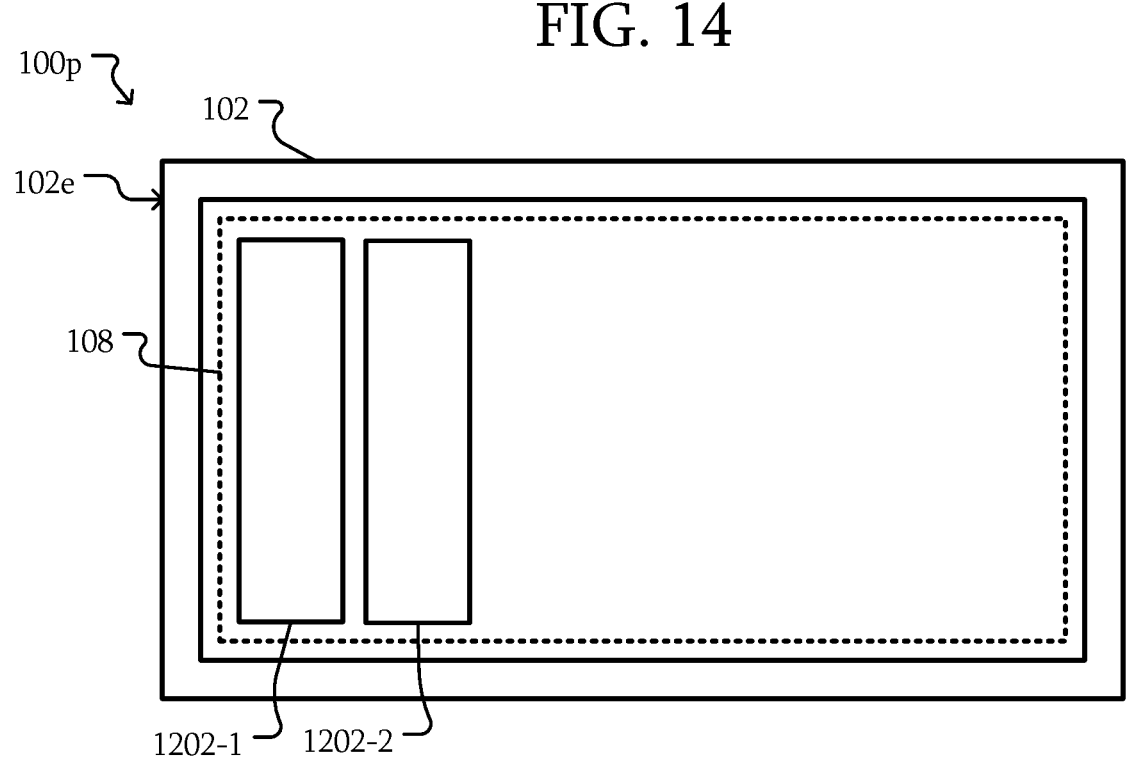
FIG. 14 is a block diagram of an x-ray detector with a plastic housing and multiple printed circuit boards according to some embodiments.

FIG. 14 is a block diagram of an x-ray detector with a plastic housing and multiple printed circuit boards according to some embodiments. The x-ray detector 100p may be similar to the x-ray detectors 100n-o. However, the x-ray detector 100p includes multiple PCBs 1202. Here, two PCBs 1202-1 and 1202-2 are used on the same side of the x-ray detector 100p as an example; however, in other embodiments, any number of PCBs 1202 may be included in the x-ray detector 100p. In addition, while the two PCBs 1202-1 and 1202-2 are disposed along one side of the plastic housing 102, in other embodiments, the PCBs 1202 may be disposed along different sides, such as on the opposite, orthogonal, or other sides of the x-ray detector 100p, or in different locations.

In some embodiments, some to all of the PCBs 1202 are similar to one or more of the PCBs 1202 described above with respect to FIGS. 12 and 13. That is, the mount points 1204, orientation, position, or the like of the PCBs 1202 may be similar to those described above. For example, even if the PCB 1202-2 is closer to the center 102d than PCB 1202-1, the PCB 1202-2 may still experience less flexing due to the mount points 1204, orientation, position, or the like. In addition, the use of multiple PCBs 1202 may also reduce a potential impact of flexing. For example, a PCB 1202 that spanned the location of PCBs 1202-1 and 1202-2 would experience a larger distortion than any individual PCB 1202-1 or 1202-2.

Figure 15A:
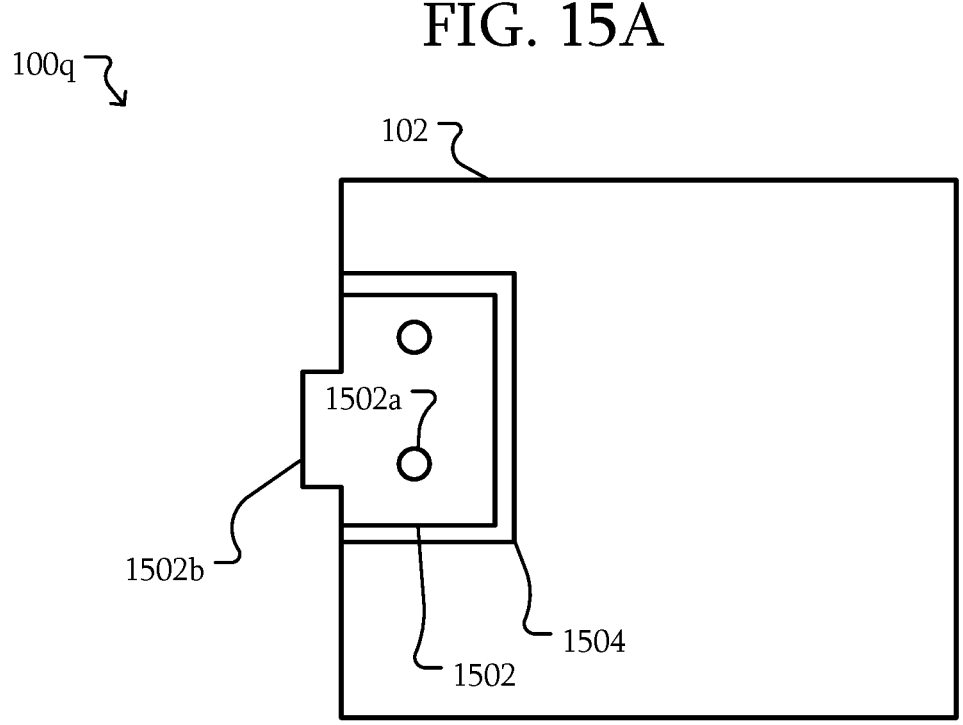
FIG. 15A-15C are block diagrams of an x-ray detector with a plastic housing and a modular adapter according to some embodiments.
Figure 15B:
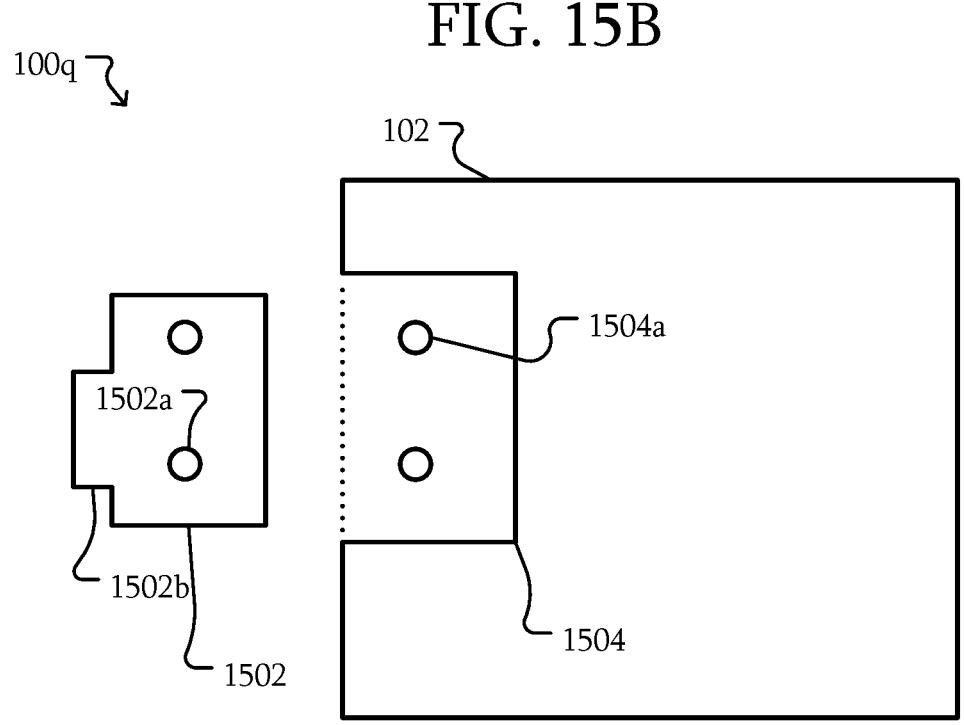
Figure 15C:
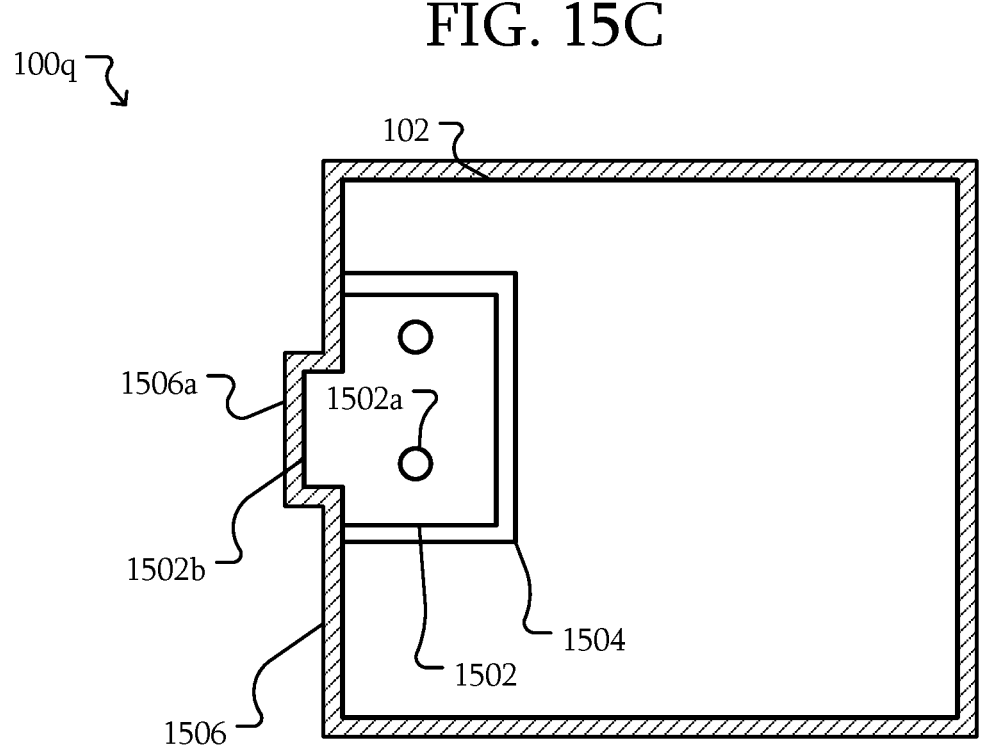

FIG. 15A-15C are block diagrams of an x-ray detector with a plastic housing and a modular adapter according to some embodiments. Referring to FIGS. 15A-15C, in some embodiments, the x-ray detector 100q may be similar to the x-ray detectors 100a-p. The x-ray detector 100q includes a modular adapter 1502 having a first mechanical interface 1502a and a second mechanical interface 1502b. The modular adapter 1502 may be removable from the plastic housing 102. The plastic housing 102 includes a receptacle 1504 configured to receive the modular adapter 1502. The receptacle 1504 includes a third mechanical interface 1504a configured to mate with the first mechanical interface 1502a of the modular adapter 1502. In some embodiments, the mating of the first mechanical interface 1502a and the third mechanical interface 1504a may be purely mechanical. In other embodiments, the first mechanical interface 1502a and the third mechanical interface 1504a may include electrical connections similar to those disclosed in U.S. Provisional Patent Application No. 63/220,941, titled "X-RAY SYSTEMS INCLUDING AN ADAPTER," filed Jul. 12, 2021, and U.S. Patent Application. Ser. No. 17/711,743, titled "X-RAY SYSTEMS INCLUDING AN ADAPTER," filed Apr. 1, 2022, the contents of each of which are incorporated by reference in their entirety.

The mechanical interfaces 1502a and 1504a may include complementary features that allow the modular adapter 1502 to be attached to the plastic housing 102. For example, the mechanical interfaces 1502a and 1504a may include protrusions and matching depressions, screws and matching threaded portions, posts and matching openings, or the like.

The modular adapter 1502 may include a structure that, when in combination with the plastic housing 102, creates a desired form. For example, a receptacle 1506, such as a bucky, for the x-ray detector 100*q* may have a particular form intended to receive an x-ray detector 100*q* having a matching complementary form. In this example, the receptacle 1506 includes a mechanical interface 1506*a* configured to mate with the mechanical interface 1502*b* of the modular adapter 1502. The mechanical interfaces 1502*b* and 1506*a* may have features similar to the mechanical interfaces 1502*a* and 1504*a*; however, the type, number, configuration, or the like may or may not be the same as mechanical interfaces 1502*a* and 1504*a*.

Figure 16A:
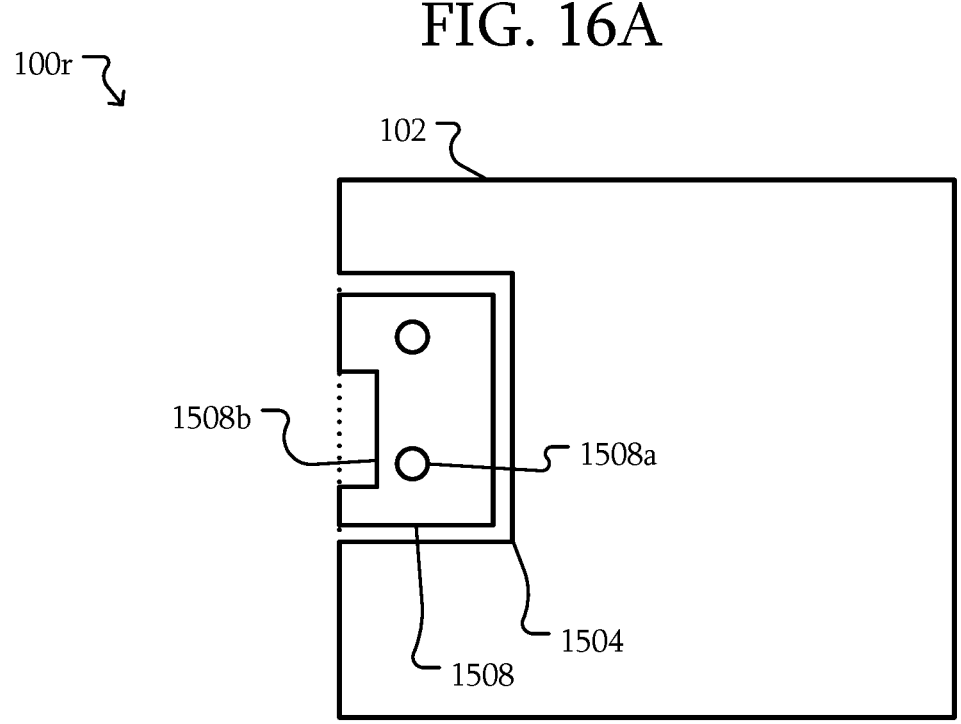
FIG. 16A-16C are block diagrams of an x-ray detector with a plastic housing and another modular adapter according to some embodiments.
Figure 16B:
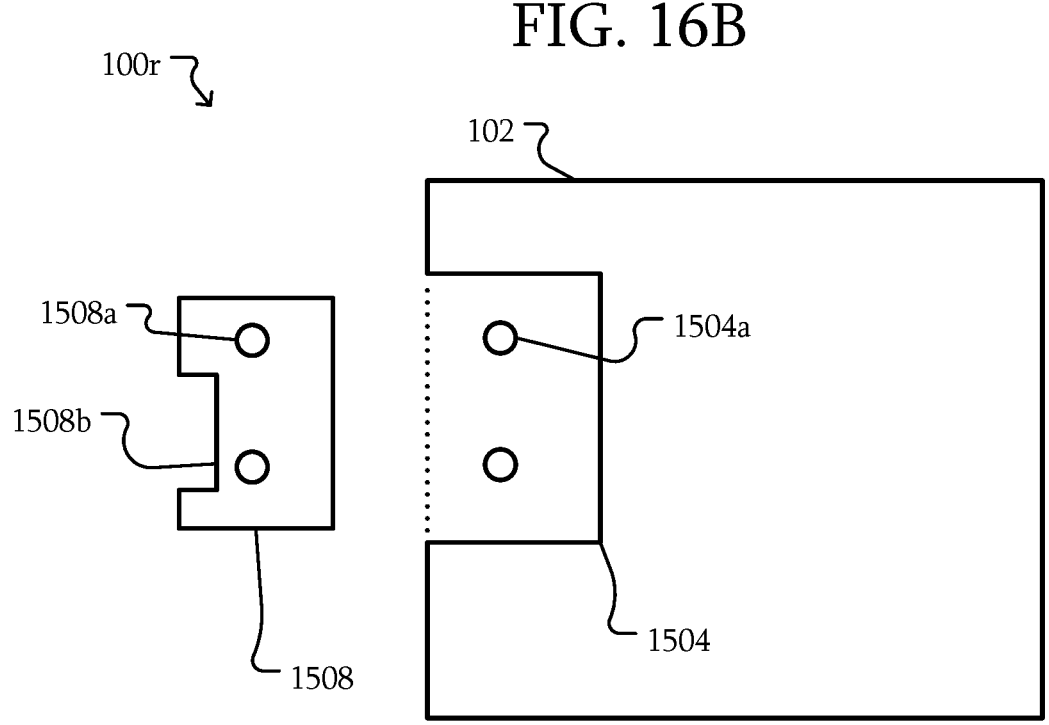
Figure 16C:
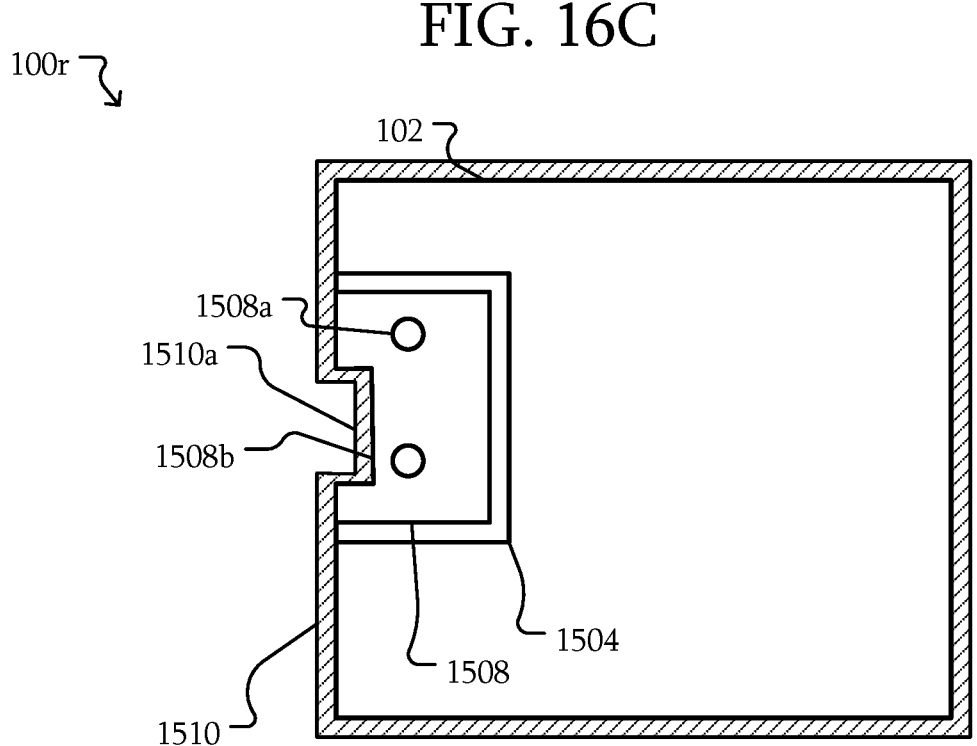

FIG. 16A-16C are block diagrams of an x-ray detector with a plastic housing and another modular adapter according to some embodiments. Referring to FIGS. 16A-16C, in some embodiments, the x-ray detector 100*r* may be similar to the x-ray detector 100*q*. In particular, the plastic housing 102 including the receptacle 1504 may be identical between the x-ray detectors 100*q* and 100*r*. However, a different modular adapter 1508 with mechanical interfaces 1508*a* and 1508*b* is attached to the receptacle 1504. As a result, the x-ray detector 100*r* may be configured to be placed in a receptacle 1510 with a mechanical interface 1510*a* that is configured to mate with the mechanical interface 1508*b*.

The modular adapter 1508 includes mechanical interface 1508*a* that is configured to mate with the mechanical interface 1504*a*. Although the mechanical interface 1508*a* may mate with the mechanical interface 1504*a* in the same manner as the mechanical interface 1502*a*, in other embodiments, the mechanical interface 1508*a* may mate with the mechanical interface 1504*a* in a different manner. For example, the mechanical interface 1508*a* may have fewer locations for fasteners, a smaller structure that does not occupy the entire receptacle 1504, or the like. However, the mechanical interface 1504*a* of the receptacle is configured to mate with both mechanical interfaces 1502*a* and 1508*a*.

As a result, the same plastic housing 102 and other components may be reconfigured into either the x-ray detector 100*q* or 100*r* depending on which modular adapter 1502 or 1508 is attached to the receptacle 1504. This allows for the same underlying components to be used to form x-ray detectors that comply with a variety of different form factors.

In some embodiments, the receptacle 1504 is part of the ingress protection boundary for the x-ray detector 100*q*/100*r*. The attachments or removal of a modular adapter 1502, 1508, or others may not compromise a seal of the ingress protection boundary.

Figure 17:
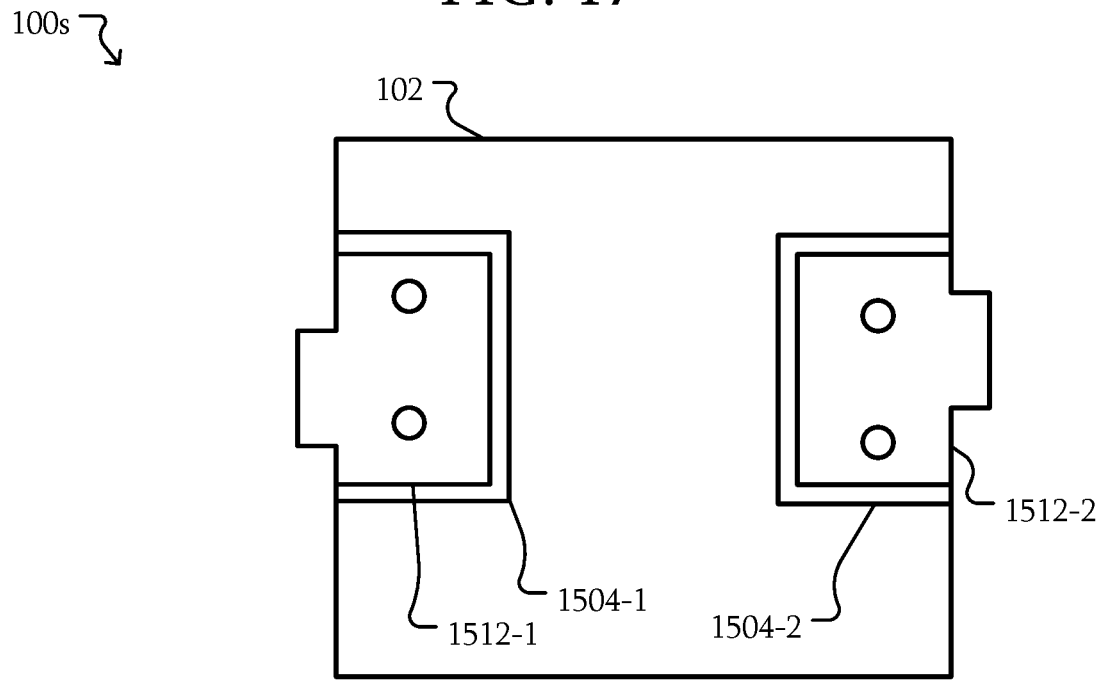
FIG. 17 is a block diagram of an x-ray detector with a plastic housing and multiple modular adapters according to some embodiments.

FIG. 17 is a block diagram of an x-ray detector with a plastic housing and multiple modular adapters according to some embodiments. The x-ray detector 100*s* may be similar to the x-ray detectors 100*q* and 100*r*. However, the x-ray detector 100*s* includes multiple modular adapters 1512. In this example, the x-ray detector 100*s* includes two modular adapters 1512-1 and 1512-2; however, in other embodiments, the number may be more. The modular adapters 1512 may be the same or different, two or more of the modular adapters 1512 may be the same while one or more other modular adapters 1512 are different.

In some embodiments, the different form factors may correspond to different x-ray systems. In addition, the plastic housing 102 without any modular adapters such as modular adapters 1502, 1508, 1512, or the like, may have a form that is the geometric intersection of all shapes of x-ray detectors. The addition of one or more modular adapters such as modular adapters 1502, 1508, or the like may be used to configure the x-ray detector 100*s* to the particular application.

Although the modular adapters such as modular adapters 1502, 1508, and 1512 have been illustrated as being a single component coupling directly to the plastic housing 102, in some embodiments, a modular adapter may be formed by combining multiple structures, multiple modular adapters, or the like together.

Figure 18A:
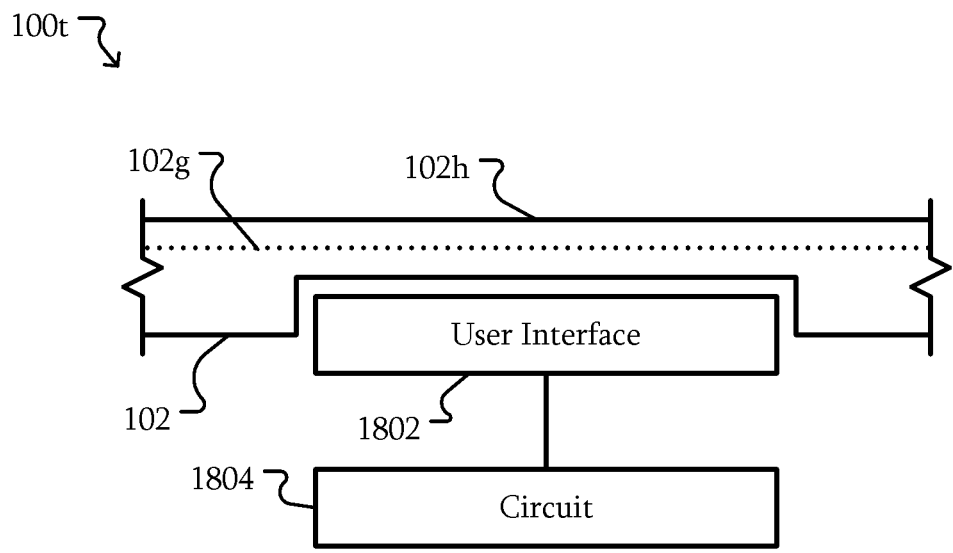
FIGS. 18A and 18B are block diagrams of a portion of an x-ray detector with a plastic housing and a user interface according to some embodiments.
Figure 18B:
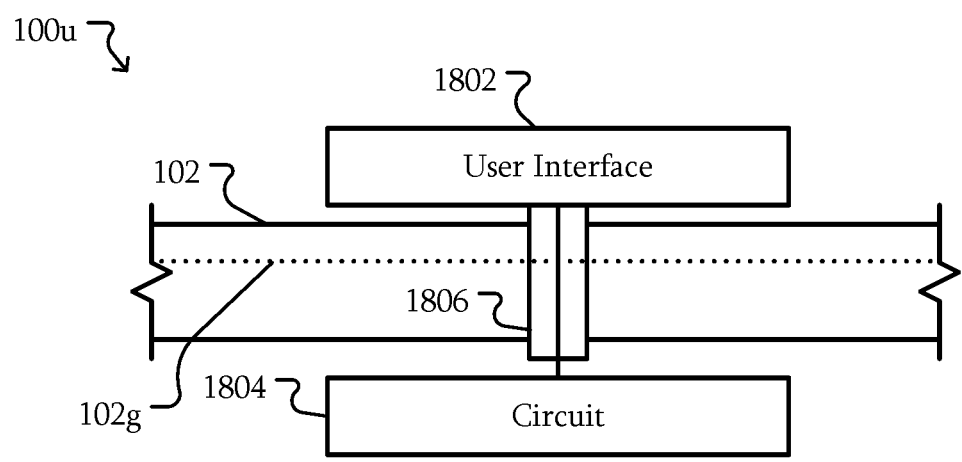

FIGS. 18A and 18B are block diagrams of a portion of an x-ray detector with a plastic housing and a user interface according to some embodiments. Referring to FIG. 18A, in some embodiments, the x-ray detector 100*t* may be similar to the x-ray detectors 100*a*-*r*. However, the x-ray detector 100*t* includes a user interface 1802 disposed within the plastic housing 102. A portion of the x-ray detector 100*t* is illustrated showing the relationship of the user interface 1802, plastic housing 102, and the ingress protection boundary 102*g*.

The user interface 1802 may include a variety of input and output devices. For example, the user interface may include output devices such as a display, lights, light emitting diodes, speakers, or the like. The user interface 1802 may also include input devices such as buttons, touch screens, or the like. The user interface 1802 may be electrically connected to a circuit 1804.

As described above, the plastic housing 102 and the front plate 104 may form at least a part of an ingress protection boundary 102*g*. The user interface 1802 is exposed through the plastic housing 102 without penetrating the ingress protection boundary 102*g*, where exposed mean accessible or visible to a user so a user can access the user interface 1802 as an input device or an output device. In this example, the plastic housing 102 includes a portion 102*h* that allows access to the user interface 1802.

In some embodiments, the plastic housing 102 could be made thin or partially translucent in the portion 102*h*. As a result, displays, touch screens, status lights or the like may be visible and/or accessible through the portion 102*h*. However, the ingress protection boundary 102*g* may not be compromised. In a particular example, as the plastic housing 102 is non-conductive, capacitive touch buttons or sensors could be placed inside the plastic housing 102 and still be accessed by a user from the outside without a physical break or hole in the plastic housing 102. While the portion 102*h* has been described as being different from the rest of the plastic housing 102 in some manner, in other embodiments, the plastic housing 102 may be the same in portion 102*h* as long as the user interface 1802 is accessible.

Referring to FIG. 18B, in some embodiments the x-ray detector 100*u* may be similar to the x-ray detectors 100*a*-*r*. However, the x-ray detector 100*u* includes a user interface 1802 disposed outside of the plastic housing 102. The user interface 1802 may be electrically connected to a circuit 1804 within the plastic housing 102 through an electrical interface 1806. For example, the electrical interface may include wires that extend through a grommet, potting material, connectors, or the like that maintain the ingress protection boundary 102*g*. The electrical interface 1806 may be any structure that may both allow for electrical signals and/or power to pass through the plastic housing 102 while also maintaining the ingress protection boundary 102*g* formed by the plastic housing 102 and the front plate 104.

Figure 19:
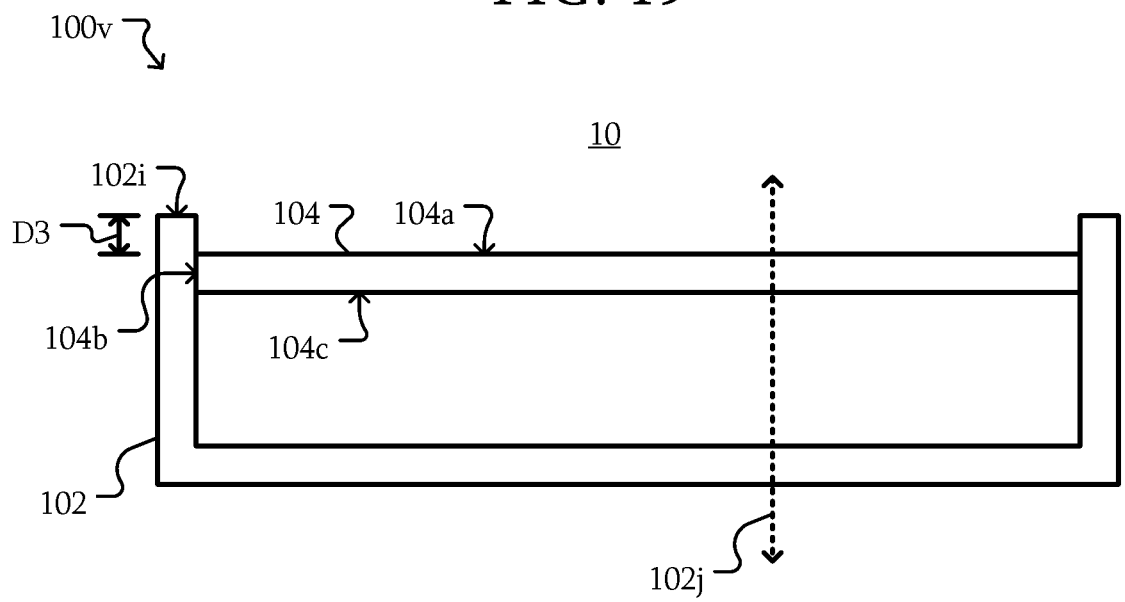
FIG. 19 is a block diagram of an x-ray detector with a plastic housing extending beyond a front plate according to some embodiments.

FIG. 19 is a block diagram of an x-ray detector with a plastic housing extending beyond a front plate according to some embodiments. In some embodiments, the x-ray detector 100*v* may be similar to the x-ray detectors 100*a*-*u*. However, the x-ray detector 100*v* includes a plastic housing 102 that extends beyond the front plate 104. In particular, the front plate 104 includes an outer surface 104*a* facing an exterior 10 of the x-ray detector 100v. The plastic housing 102 includes a wall 102i extending further from the x-ray detector 100v than the outer surface 104a of the front plate 104 along an axis 102j perpendicular to the outer surface 104a of the front plate 104. In this example, the extension 102k of the wall 102i extends a distance D3 further than the outer surface 104a of the front plate 104. In some embodiments, the distance D3 may be from about 0.2 millimeters (mm) to about 0.3 mm. In other embodiments, the distance D3 may be based on a thickness of the plastic housing 102, such as from about 10% to about 30% of the thickness of the plastic housing 102.

The wall 102i may extend this distance around the entire perimeter of the x-ray detector 100v. Thus, the extension 102k of the wall 102i may prevent contact with a side 104b of the front plate 104, the bottom 104c of the front plate 104, or components attached to the bottom 104c. In particular, contact by a user with a conductive surface may be prevented, as electric leakage or static electricity is better contained within the x-ray detector 100v. Even if the side 104b of the front plate 104 does not contact the wall 102i, the extension 102k may make contact to the side 104b or structures further inside the plastic housing 102 more difficult or impossible. As a result, conductive paths through which a user may be shocked may be reduced or eliminated.

Figure 20A:
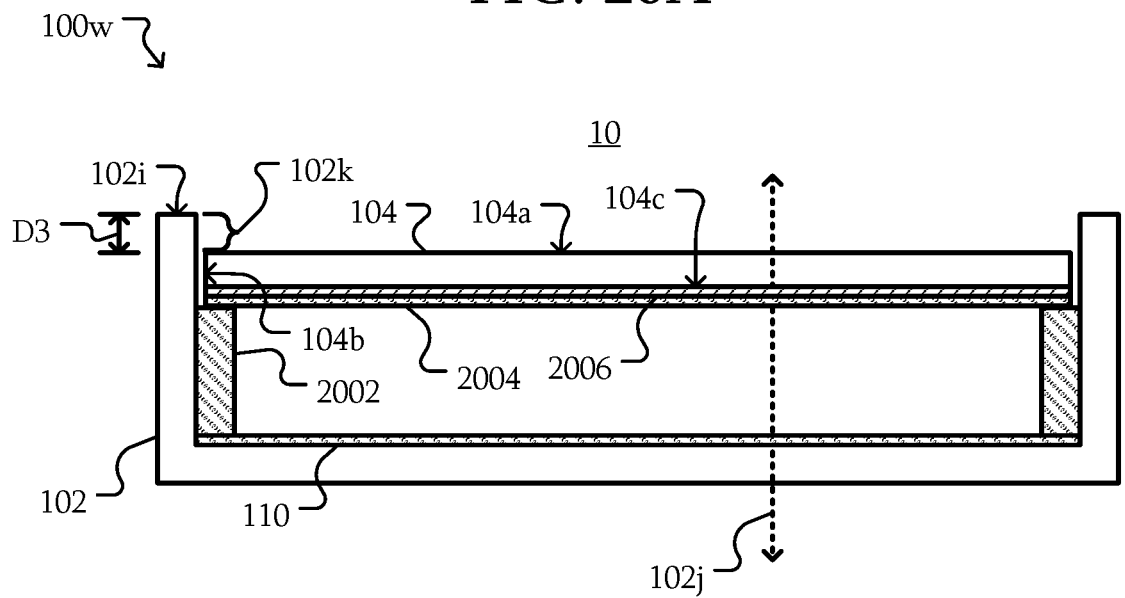
FIGS. 20A-20C are block diagrams of an x-ray detector with a plastic housing with an insulated front plate according to some embodiments.
Figure 20B:
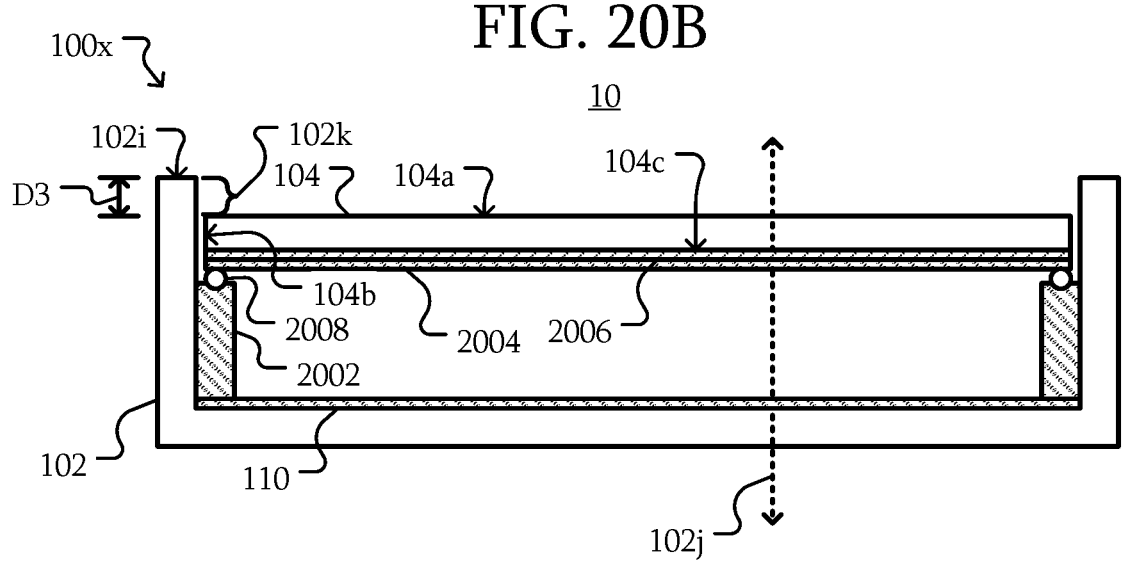
Figure 20C:
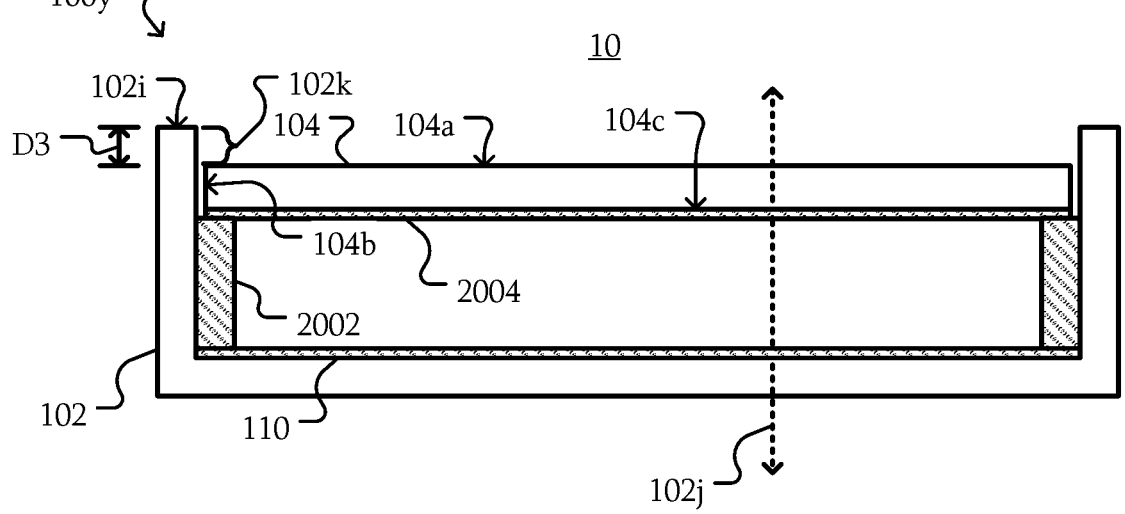

FIGS. 20A-20C are block diagrams of an x-ray detector with a plastic housing with an insulated front plate according to some embodiments. As used herein, insulated and insulating refer to electrically insulated and electrically insulating, respectively. As used herein, conductive refer to electrically conductive. Referring to FIG. 20A, in some embodiments, the x-ray detector 100w may be similar to the x-ray detector 100v. However, the x-ray detector 100w includes a conductive support 2002 configured to support the front plate 104. The conductive support 2002 may include a metal support, a portion of the plastic housing 102 that is covered by a conductive surface, or the like.

The x-ray detector 100w includes a conductive sheet 2004 electrically connected to the conductive support 2002. The conductive sheet 2004 may include a conductive material that is substantially transparent to x-rays. Substantially transparent to x-rays includes a transmission coefficient that results in an efficiency for the x-ray detector 100w given the performance of other components. For example, the conductive sheet 2004 may include an aluminum sheet having a thickness resulting in a transmission coefficient greater than 0.88, 0.9, or the like. In some embodiments, the conductive sheet 2004 may have a transmission coefficient from about 0.95 to about 0.99.

The x-ray detector 100w includes an insulating sheet 2006 disposed between the conductive sheet 2004 and the front plate 104 such that the front plate 104 is insulated from the conductive sheet 2004. The insulating sheet 2006 may include fiberglass, non-conductive epoxy, polyamide, plastic (including PET plastic), or the like.

In some embodiments, the plastic housing 102 includes a conductive coating 110 as described above. The conductive coating 110 is electrically connected to the conductive support 2002. The conductive support 2002 may be electrically connected to the conductive sheet 2004. As a result, the conductive coating 110, the conductive support 2002, and the conductive sheet 2004 form at least part of an electromagnetic interference shield around the two-dimensional sensor array 108.

Referring to FIG. 20B, in some embodiments, the x-ray detector 100x may be similar to the x-ray detector 100w. The x-ray detector 100w includes a conductive gasket 2008 disposed between the conductive sheet 2004 and the conductive support 2002. The conductive gasket 2008 may be configured to electrically connect the conductive sheet 2004 and the conductive support 2002. The conductive gasket 2008 may be configured to seal an interface between the conductive sheet 2004 and the conductive support 2002. The conducive gasket 2008 may be similar to the conductive gasket 132, and may help to establish or improve the Ingress Protection Code level.

Referring to FIG. 20C, in some embodiments, the x-ray detector 100y may be similar to the x-ray detectors 100w-x. The x-ray detector 100y is illustrated as having a structure similar to that of x-ray detector 100w, but in other embodiments, the conductive gasket 132 may be included similar the x-ray detector 100x. As described above, the front plate 104 may be formed of an insulating material such as impact-resistant plastic, non-impact resistant plastic, polycarbonate, acrylic, or the like. As a result, the insulating sheet 2006 may be omitted as the front plate 104 itself may be the insulating structure. The insulating front plate 104 may be outside of an EMI shield such as one that includes the conductive sheet 2004, conductive support 2002, and conductive coating 110.

In some embodiments, due to the configuration of the insulating sheet 1206, an insulating front plate 104, and/or other components, a path through which the internal conducting surfaces and components of the x-ray detectors 100 may be contacted by a user may be reduced or eliminated. As a result, a probability that a user may be shocked may be reduced or eliminated.

Figure 21:
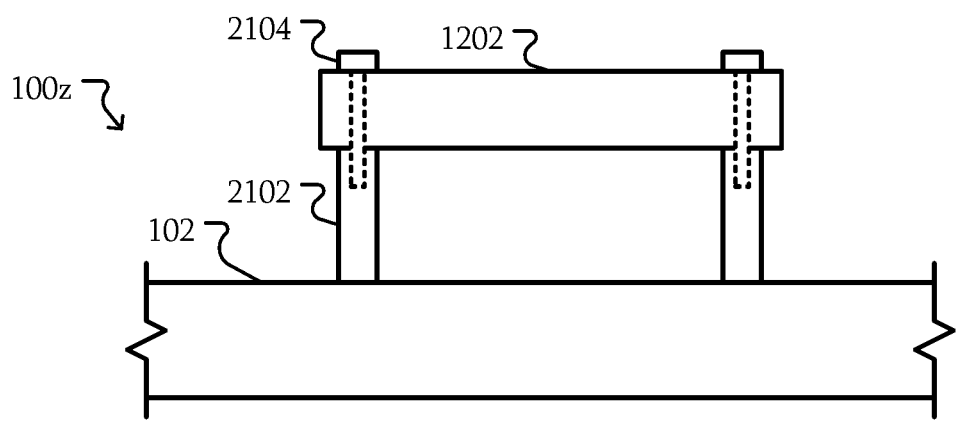
FIG. 21 is a block diagram of a portion of an x-ray detector with a plastic housing using metal fasteners according to some embodiments.

FIG. 21 is a block diagram of a portion of an x-ray detector with a plastic housing using metal fasteners according to some embodiments. The x-ray detector 100z may be similar to the x-ray detectors 100a-x. However, the plastic housing 102 includes mount points 2102. Here, standoffs or posts are used as examples of the mount points 2102; however, in other embodiments different types of mount points 2102 may be used. A PCB 1202 may be mounted to the plastic housing 102 at the mount points 2102. Fasteners 2104 such as a screw, bolt, nut, clip, or the like may interface with the mount points 2102 to attach the PCB 1202 to the plastic housing 102. The PCB 1202 is used as an example of what may be attached to the plastic housing 102. In another example, exterior handles (not shown) may be attached to plastic housing 102 in this manner using metal fasteners.

Each of multiple metal fasteners are used in a manner such that the metal fastener mates with a non-metal component. In this example, fastener 2104 may be a metal screw. The metal screw may mate with a threaded portion of the mount point 2102. That threaded portion may be plastic as it may be a molded portion of the plastic housing 102. Depending on the configuration of the fastener 2104, the mount point 2102 may not be threaded. In another example, a metal insert, such as a helical insert, may be inserted into the mount point 2102. The fastener 2104 in this example may be a non-metal fastener, such as a plastic screw.

In both examples, the interface between fasteners is a metal to non-metal interface. This interface reduces or eliminates the formation of metal particles. Such metal particles may cause a failure of the x-ray detector 100z. Reducing or eliminating the metal particles may reduce or eliminate such failures.

Figure 22:
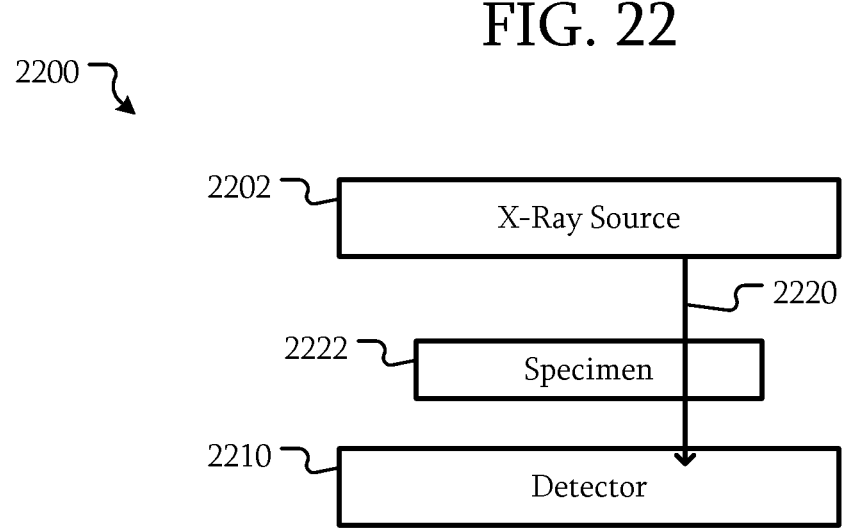
FIG. 22 is a block diagram of a 2D x-ray imaging system according to some embodiments.

FIG. 22 is a block diagram of a 2D x-ray imaging system according to some embodiments. The 2D x-ray imaging system 2200 includes an x-ray source 2202 and detector 2210. The detector 2210 may include an x-ray detector 100 or the like as described above. The x-ray source 2202 is disposed relative to the detector 2210 such that x-rays 2220 may be generated to pass through a specimen 2222 and detected by the detector 2210. In some embodiments, the detector 2210 is part of a medical imaging system. In other embodiments, the 2D x-ray imaging system 2200 may include a portable vehicle scanning system as part of a cargo scanning system.

As used herein an x-ray detector 100 refers to any of the x-ray detector 100*a-y* described above.

An x-ray detector, comprising: a plastic housing 102 including a conductive coating 110; a two-dimensional sensor array 108 disposed in a within the plastic housing 102 and configured to generate image data in response to incident x-rays; a front plate 104 connected to the plastic housing, the front plate 104 and the plastic housing 102 forming an enclosure surrounding the two-dimensional sensor array 108; wherein the conductive coating 110 and the front plate 104 form at least part of an electromagnetic interference shield around the two-dimensional sensor array 108.

In some embodiments, the enclosure meets or exceeds Ingress Protection Code IP67.

In some embodiments, the plastic housing 102 is a continuous structure with only a first opening configured to receive the front plate 104.

In some embodiments, the x-ray detector further comprises battery contacts 114; wherein: the plastic housing 102 is a continuous structure with only a first opening configured to receive the front plate 104 and a second opening; and the battery contacts 114 are disposed in the second opening.

In some embodiments, the conductive coating 110 comprises a conductive paint.

In some embodiments, the x-ray detector further comprises a coating 116 disposed on the conductive paint.

In some embodiments, the conductive paint comprises a copper paint, a silver paint, a nickel paint, or an alloy paint or a mixture paint of copper, silver, or nickel.

In some embodiments, the conductive coating 110 has a thickness between about 100 micrometers (μm) and 300 μm.

In some embodiments, the x-ray detector further comprises conductive straps 120 electrically connecting the conductive coating 110 to the two-dimensional sensor array 108.

In some embodiments, the x-ray detector further comprises a conductive elastically deformable material 122 electrically connected between the two-dimensional sensor array 108 and at least one of the conductive coating 110 and the front plate 104.

In some embodiments, the two-dimensional sensor array 108 is electrically connected to the electromagnetic interference shield through at least two electrical connections.

In some embodiments, the x-ray detector further comprises an antenna 124 electrically connected to the two-dimensional sensor array 108; wherein the antenna 124 is disposed within the enclosure such that a wall of the plastic housing 102 is disposed between the antenna 124 and a region external to the enclosure.

In some embodiments, the x-ray detector further comprises a conductive gasket 132 disposed between the front plate 104 and the plastic housing 102 and electrically connected to the front plate 104 and the conductive coating 110 and sealing an interface between the front plate 104 and the plastic housing 102.

In some embodiments, the x-ray detector further comprises at least one rigid component 134 attached to the plastic housing 102.

In some embodiments, the x-ray detector further comprises a conductive material 110, 136 covering the at least one rigid component 134 and electrically connected to the conductive coating 110.

In some embodiments, the at least one rigid component 134 is attached to the plastic housing 102 through an adhesive 138.

In some embodiments, the x-ray detector further comprises at least one corner bumper 140, each corner bumper 140 comprising: a tip 142 formed from a first material; and a body 144 formed from a second material different from the first material.

In some embodiments, the first material is rubber; and the second material is impact-resistant plastic.

In some embodiments, for each corner bumper 140: the corner bumper 140 is integrally formed.

In some embodiments, for each corner bumper 140: the corner bumper 140 is removably attached to the plastic housing 102.

In some embodiments, for each corner bumper 140: the corner bumper 140 is entirely within a rectangle coincident with each side of an outer perimeter of the plastic housing 102 in plan view.

Some embodiments include a method of forming an x-ray detector, comprising: providing a plastic housing 102; applying a conductive coating 110 to the plastic housing 102; attaching a two-dimensional sensor array 108 configured to generate image data in response to incident x-rays to the plastic housing 102; forming an enclosure surrounding the two-dimensional sensor array 108 using the plastic housing 102 and a front plate 104; and electrically connecting the two-dimensional sensor array 108 to the conductive coating 110.

Some embodiments include an n x-ray detector, comprising: a plastic housing 102 including at least one rigid component attached to the plastic housing 102; a two-dimensional sensor array 108 disposed in a within the plastic housing 102 and configured to generate image data in response to incident x-rays; a front plate 104 connected to the housing, the front plate 104 and the plastic housing 102 forming an enclosure surrounding the two-dimensional sensor array 108.

Some embodiments include an x-ray detector, comprising: means for generating image data in response to x-rays; non-conductive means for supporting the means for generating the image data in response to the x-rays; means for forming an enclosure with the non-conductive means for supporting; electrically conductive means conformably disposed on the non-conductive means for shielding the means for generating the image data in response to the x-rays within the enclosure from electromagnetic interference.

Examples of the means for generating image data in response to x-rays include the two-dimensional sensor array 108.

Examples of the non-conductive means for supporting the means for generating the image data in response to the x-rays include plastic housing 102.

Examples of the means for forming an enclosure with the non-conductive means for supporting include front plate 104.

Examples of the electrically conductive means conformably disposed on the non-conductive means for shielding the means for generating the image data in response to the x-rays within the enclosure from electromagnetic interference include the conductive coating 110 and the conductive material 136.

In some embodiments, the x-ray detector further comprises means for conductively coating the non-conductive means for supporting. Examples of the means for conductively coating the non-conductive means for supporting include the conductive paint.

Some embodiments include an x-ray detector, comprising: a plastic housing 102; a two-dimensional sensor array 108 disposed in a within the plastic housing 102 and configured to generate image data in response to incident x-rays; a front plate 104 connected to the plastic housing 102, the front plate 104 and the plastic housing 102 forming an enclosure surrounding the two-dimensional sensor array 108; and a printed circuit board 1202 mounted to the plastic housing 102 at a plurality of mount points 1204; wherein a centroid of the printed circuit board 1202 is closer to a center of the plastic housing 102 than a centroid of the mount points 1204.

In some embodiments, the two-dimensional sensor array 108 includes a flexible substrate.

In some embodiments, a first number of the mount points 1204 are disposed along an edge of the printed circuit board 1202 furthest from the center of the plastic housing 102; a second number of mount points 1204 are disposed along an edge of the printed circuit board 1202 closest to the center of the plastic housing 102; and the first number is greater than the second number.

In some embodiments, the printed circuit board 1202 is disposed along an edge of the plastic housing 102 where the centroid of the printed circuit board 1202 is closer to the edge than the center of the plastic housing 102.

In some embodiments, a first dimension of the printed circuit board 1202 along an axis including the center of the plastic housing 102 is less than a second dimension of the printed circuit board 1202 along a major axis of the printed circuit board 1202.

In some embodiments, a major axis of the printed circuit board 1202 is substantially perpendicular to a major axis of the plastic housing 102.

In some embodiments, the x-ray detector further comprises: a modular adapter 1502, 1508, 1512 having a first mechanical interface and a second mechanical interface; wherein the plastic housing 102 includes a receptacle configured to receive the modular adapter 1502, 1508, 1512 and the receptacle includes a third mechanical interface configured to mate with the first mechanical interface.

In some embodiments, the x-ray detector further comprises: a user interface 1802 disposed within the plastic housing 102; wherein: the plastic housing 102 and the front plate 104 form at least a part of an ingress protection boundary; and the user interface 1802 is accessible through the plastic housing 102 without penetrating the ingress protection boundary.

In some embodiments, the x-ray detector further comprises: a user interface 1802 disposed outside of the plastic housing 102; and an electrical interface electrically connecting the user interface 1802 to a circuit within the plastic housing 102; wherein: the plastic housing 102, the electrical interface, and the front plate 104 form at least a part of an ingress protection boundary.

In some embodiments, the front plate 104 includes an outer surface facing an exterior of the x-ray detector; and the plastic housing 102 includes a wall extending further from the x-ray detector than the outer surface of the front plate 104 along an axis perpendicular to the outer surface of the front plate 104.

In some embodiments, the x-ray detector further comprises: a conductive sheet 2004; and an insulating sheet 2006 disposed between the conductive sheet 2004 and the front plate 104 such that the front plate 104 is insulated from the conductive sheet 2004; wherein: the plastic housing 102 includes a conductive coating 110 electrically connected to the conductive sheet 2004.

In some embodiments, the x-ray detector further comprises: a conductive support 2002 configured to support the front plate 104; a conductive sheet 2004 electrically coupled to the conductive support 2002; and an electromagnetic interference shield around the two-dimensional sensor array 108; wherein: the conductive support 2002, and the conductive sheet 2004 are at least part of the electromagnetic interference shield.

In some embodiments, the x-ray detector further comprises: a conductive gasket 2008 disposed between the conductive sheet 2004 and the conductive support 2002, electrically connected to the conductive sheet 2004 and the conductive support 2002, and configured to seal an interface between the conductive sheet 2004 and the conductive support 2002.

In some embodiments, the x-ray detector further comprises: a plurality of metal fasteners 2104 configured to attach together the plastic housing 102 to at least one of the two-dimensional sensor array 108, the front plate 104, and the printed circuit board 1202; wherein each of the metal fasteners 2104 is disposed such that the metal fastener mates with a non-metal component.

In some embodiments, the x-ray detector further comprises: at least one rigid component attached to the plastic housing 102; wherein the at least one rigid component includes a plate.

In some embodiments, the x-ray detector further comprises an electromagnetic interference shield around the two-dimensional sensor array 108; wherein the front plate 104 includes an insulating material outside of the electromagnetic interference shield.

Some embodiments include a method of forming an x-ray detector, comprising: providing a plastic housing 102; attaching a two-dimensional sensor array 108 configured to generate image data in response to incident x-rays to the plastic housing 102; attaching a printed circuit board 1202 to the plastic housing 102 at a plurality of mount points 1204 where a centroid of the printed circuit board 1202 is closer to a center of the plastic housing 102 than a centroid of the mount points 1204; and forming an enclosure surrounding the two-dimensional sensor array 108 using the plastic housing 102 and a front plate 104.

In some embodiments, the method further comprises: attaching at least one modular adapter 1502, 1508, 1512 to a corresponding receptacle in the plastic housing 102

In some embodiments, the method further comprises: electrically insulating the front plate 104 of the x-ray detector from an electromagnetic interference shield around the two-dimensional sensor array 108

In some embodiments, at least one of attaching the printed circuit board 1202 to the plastic housing 102 and forming the enclosure surrounding the two-dimensional sensor array 108 using the plastic housing 102 and the front plate 104 comprises attaching a metal fastener to a non-metal component In some embodiments, the method further comprises: mounting a user interface 1802 to the plastic housing 102 such that the user interface 1802 is accessible through the plastic housing 102

Some embodiments include an x-ray detector, comprising: plastic housing 102 including a conductive coating 110; a flexible two-dimensional sensor array 108 disposed in a within the plastic housing 102 and configured to generate image data in response to incident x-rays; a front plate 104 connected to the plastic housing 102, the front plate 104 and the plastic housing 102 forming an enclosure surrounding the two-dimensional sensor array 108; and an electromagnetic interference shield around the two-dimensional sensor array 108; wherein the conductive coating 110 and the front plate 104 are at least part of the electromagnetic interference shield.

Although the structures, devices, methods, and systems have been described in accordance with particular embodiments, one of ordinary skill in the art will readily recognize that many variations to the particular embodiments are possible, and any variations should therefore be considered to be within the spirit and scope disclosed herein. Accordingly, many modifications may be made by one of ordinary skill in the art without departing from the spirit and scope of the appended claims.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description. These additional embodiments are determined by replacing the dependency of a given dependent claim with the phrase "any of the claims beginning with claim [x] and ending with the claim that immediately precedes this one," where the bracketed term "[x]" is replaced with the number of the most recently recited independent claim. For example, for the first claim set that begins with independent claim 1, claim 4 can depend from either of claims 1 and 3, with these separate dependencies yielding two distinct embodiments; claim 5 can depend from any one of claim 1, 3, or 4, with these separate dependencies yielding three distinct embodiments; claim 6 can depend from any one of claim 1, 3, 4, or 5, with these separate dependencies yielding four distinct embodiments; and so on.

Recitation in the claims of the term "first" with respect to a feature or element does not necessarily imply the existence of a second or additional such feature or element. Elements specifically recited in means-plus-function format, if any, are intended to be construed to cover the corresponding structure, material, or acts described herein and equivalents thereof in accordance with 35 U.S.C. § 112 (f). Embodiments of the invention in which an exclusive property or privilege is claimed are defined as follows.

The invention claimed is:

1. An x-ray detector, comprising:
a plastic housing;
a two-dimensional sensor array disposed within the plastic housing and configured to generate image data in response to incident x-rays;
a front plate connected to the plastic housing, the front plate and the plastic housing forming an enclosure surrounding the two-dimensional sensor array; and
a printed circuit board mounted to the plastic housing at a plurality of mount points;
wherein a centroid of the printed circuit board is closer to a center of the plastic housing than a centroid of the mount points.

2. The x-ray detector of claim 1, wherein:
the two-dimensional sensor array includes a flexible substrate.

3. The x-ray detector of claim 1, wherein:
a first number of the mount points are disposed along an edge of the printed circuit board furthest from the center of the plastic housing;
a second number of mount points are disposed along an edge of the printed circuit board closest to the center of the plastic housing; and
the first number is greater than the second number.

4. The x-ray detector of claim 1, wherein:
the printed circuit board is disposed along an edge of the plastic housing where the centroid of the printed circuit board is closer to the edge than the center of the plastic housing.

5. The x-ray detector of claim 1, wherein:
a first dimension of the printed circuit board along an axis including the center of the plastic housing is less than a second dimension of the printed circuit board along a major axis of the printed circuit board.

6. The x-ray detector of claim 1, further comprising:
a modular adapter having a first mechanical interface and a second mechanical interface;
wherein the plastic housing includes a receptacle configured to receive the modular adapter and the receptacle includes a third mechanical interface configured to mate with the first mechanical interface.

7. The x-ray detector of claim 1, further comprising:
a user interface disposed within the plastic housing;
wherein:
the plastic housing and the front plate form at least a part of an ingress protection boundary; and
the user interface is accessible through the plastic housing without penetrating the ingress protection boundary.

8. The x-ray detector of claim 1, further comprising:
a user interface disposed outside of the plastic housing; and
an electrical interface electrically connecting the user interface to a circuit within the plastic housing;
wherein:
the plastic housing, the electrical interface, and the front plate form at least a part of an ingress protection boundary.

9. The x-ray detector of claim 1, wherein:
the front plate includes an outer surface facing an exterior of the x-ray detector; and
the plastic housing includes a wall extending further from the x-ray detector than the outer surface of the front plate along an axis perpendicular to the outer surface of the front plate.

10. The x-ray detector of claim 1, further comprising:
a conductive sheet; and
an insulating sheet disposed between the conductive sheet and the front plate such that the front plate is insulated from the conductive sheet;
wherein:
the plastic housing includes a conductive coating electrically connected to the conductive sheet.

11. The x-ray detector of claim 1, further comprising:
a conductive support configured to support the front plate;
a conductive sheet electrically coupled to the conductive support; and
an electromagnetic interference shield around the two-dimensional sensor array;
wherein:
the conductive support, and the conductive sheet are at least part of the electromagnetic interference shield.

12. The x-ray detector of claim 11, further comprising:
a conductive gasket disposed between the conductive sheet and the conductive support, electrically connected to the conductive sheet and the conductive support, and configured to seal an interface between the conductive sheet and the conductive support.

13. The x-ray detector of claim 1, further comprising:
a plurality of metal fasteners configured to attach together the plastic housing to at least one of the two-dimensional sensor array, the front plate, and the printed circuit board;
wherein each of the metal fasteners is disposed such that the metal fastener mates with a non-metal component.

14. The x-ray detector of claim 1, further comprising:
at least one rigid component attached to the plastic housing;
wherein the at least one rigid component includes a plate.

15. The x-ray detector of claim 1, further comprising:
an electromagnetic interference shield around the two-dimensional sensor array;
wherein the front plate includes an insulating material outside of the electromagnetic interference shield.

16. A method of forming an x-ray detector, comprising:
providing a plastic housing;
attaching a two-dimensional sensor array configured to generate image data in response to incident x-rays to the plastic housing;
attaching a printed circuit board to the plastic housing at a plurality of mount points where a centroid of the printed circuit board is closer to a center of the plastic housing than a centroid of the mount points; and
forming an enclosure surrounding the two-dimensional sensor array using the plastic housing and a front plate.

17. The method of claim 16, further comprising:
attaching at least one modular adapter to a corresponding receptacle in the plastic housing.

18. The method of claim 16, further comprising:
electrically insulating the front plate of the x-ray detector from an electromagnetic interference shield around the two-dimensional sensor array.

19. The method of claim 16, wherein:
at least one of attaching the printed circuit board to the plastic housing and forming the enclosure surrounding the two-dimensional sensor array using the plastic housing and the front plate comprises attaching a metal fastener to a non-metal component.

20. The method of claim 16, further comprising:
mounting a user interface to the plastic housing such that the user interface is accessible through the plastic housing.

21. An x-ray detector, comprising:
a plastic housing including a conductive coating;
a flexible two-dimensional sensor array disposed within the plastic housing and configured to generate image data in response to incident x-rays;
a front plate connected to the plastic housing, the front plate and the plastic housing forming an enclosure surrounding the flexible two-dimensional sensor array;
an electromagnetic interference shield around the flexible two-dimensional sensor array; and
a printed circuit board mounted to the plastic housing at a plurality of mount points;
wherein:
a centroid of the printed circuit board is closer to a center of the plastic housing than a centroid of the mount points;
the conductive coating and the front plate are at least part of the electromagnetic interference shield; and
a first dimension of the printed circuit board along an axis including the center of the plastic housing is less than a second dimension of the printed circuit board along a major axis of the printed circuit board.

* * * * *